(12) United States Patent
Byeon

(10) Patent No.: US 10,416,944 B2
(45) Date of Patent: Sep. 17, 2019

(54) WATCH-TYPE MOBILE TERMINAL AND METHOD OF OPERATING THE SAME

(71) Applicant: LG ELECTRONICS INC., Seoul (KR)

(72) Inventor: Jinyeong Byeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 15/336,542

(22) Filed: Oct. 27, 2016

(65) Prior Publication Data

US 2017/0115940 A1    Apr. 27, 2017

(30) Foreign Application Priority Data

Oct. 27, 2015 (KR) ................. 10-2015-0149772

(51) Int. Cl.
*G06F 3/14* (2006.01)
*G06F 3/0346* (2013.01)
*G04G 21/02* (2010.01)
*G04G 99/00* (2010.01)
*G06F 3/0484* (2013.01)
(Continued)

(52) U.S. Cl.
CPC ............. *G06F 3/14* (2013.01); *G04G 9/0064* (2013.01); *G04G 21/02* (2013.01); *G04G 99/006* (2013.01); *G06F 1/163* (2013.01); *G06F 3/017* (2013.01); *G06F 3/0346* (2013.01); *G06F 3/04817* (2013.01); *G06F 3/04845* (2013.01); *G06F 3/04847* (2013.01); *G06F 3/04883* (2013.01); *H04M 1/7253* (2013.01); *H04M 1/72533* (2013.01); *H04M 1/72566* (2013.01); *G04G 21/04* (2013.01); *G04G 21/08* (2013.01); *G06F 3/0482* (2013.01); *G09G 5/003* (2013.01); *G09G 2370/16* (2013.01); *H04M 2250/22* (2013.01)

(58) Field of Classification Search
CPC .... G06F 3/14; G06F 3/04845; G06F 3/04847; G06F 3/0346
See application file for complete search history.

(56) References Cited

U.S. PATENT DOCUMENTS 8,983,551 B2 * 3/2015 Worick ............... H04M 19/041
455/456.1
9,762,945 B2 * 9/2017 Klappert .......... H04N 21/41415
(Continued)

FOREIGN PATENT DOCUMENTS

EP    2843511 A1    8/2014
EP    2887201 A2    12/2014
(Continued)

OTHER PUBLICATIONS

European Patent Office Application Serial No. 16002187.9, Search Report dated Mar. 24, 2017, 13 pages.

*Primary Examiner* — Daeho D Song
(74) *Attorney, Agent, or Firm* — Lee, Hong, Degerman, Kang & Waimey PC

(57) ABSTRACT

A watch-type mobile terminal capable of adjusting an occurrence time of an event for an external device includes a wireless communication unit for receiving information related to the occurrence time of the event from the external device, a display unit for displaying a clock screen, and a controller for displaying a first item corresponding to the event at a position corresponding to the occurrence time on the clock screen based on the received information.

16 Claims, 29 Drawing Sheets

(51) Int. Cl.
  *G04G 9/00*     (2006.01)
  *G06F 1/16*     (2006.01)
  *G06F 3/01*     (2006.01)
  *H04M 1/725*    (2006.01)
  *G06F 3/0488*   (2013.01)
  *G06F 3/0481*   (2013.01)
  *G04G 21/08*    (2010.01)
  *G06F 3/0482*   (2013.01)
  *G09G 5/00*     (2006.01)
  *G04G 21/04*    (2013.01)

(56) References Cited

U.S. PATENT DOCUMENTS

| | | | | |
|---|---|---|---|---|
| 9,848,027 B2* | 12/2017 | Chen | | H04L 65/60 |
| 9,939,923 B2* | 4/2018 | Sharma | | G06F 3/0312 |
| 9,959,728 B2* | 5/2018 | True | | G08B 21/02 |
| 2010/0178873 A1* | 7/2010 | Lee | | H04M 1/7253 |
| | | | | 455/41.3 |
| 2011/0304648 A1* | 12/2011 | Kim | | G06F 1/1626 |
| | | | | 345/633 |
| 2013/0007842 A1* | 1/2013 | Park | | G06F 21/74 |
| | | | | 726/3 |
| 2013/0176116 A1* | 7/2013 | Jung | | G08C 17/02 |
| | | | | 340/12.5 |
| 2013/0185079 A1* | 7/2013 | Park | | D06F 33/02 |
| | | | | 704/275 |
| 2014/0080416 A1* | 3/2014 | Seo | | H04M 1/7253 |
| | | | | 455/41.2 |
| 2014/0087661 A1* | 3/2014 | Kim | | H04B 5/0025 |
| | | | | 455/41.1 |
| 2014/0111690 A1* | 4/2014 | Kim | | H04N 21/42203 |
| | | | | 348/565 |
| 2014/0176456 A1* | 6/2014 | Yoon | | G09G 3/3208 |
| | | | | 345/173 |
| 2015/0118362 A1* | 4/2015 | Raczynski | | A47J 36/00 |
| | | | | 426/87 |
| 2015/0187207 A1* | 7/2015 | Fujita | | F24F 3/065 |
| | | | | 340/12.5 |
| 2015/0227245 A1* | 8/2015 | Inagaki | | G06F 3/0412 |
| | | | | 345/173 |
| 2015/0264139 A1* | 9/2015 | Son | | H04L 67/125 |
| | | | | 709/208 |
| 2015/0281945 A1 | 10/2015 | Seo et al. | | |
| 2016/0044463 A1* | 2/2016 | Lee | | H04W 4/025 |
| | | | | 455/456.1 |
| 2016/0054892 A1* | 2/2016 | Kim | | G04G 9/007 |
| | | | | 715/808 |
| 2016/0150472 A1* | 5/2016 | Yoon | | G06F 1/3209 |
| | | | | 455/574 |
| 2016/0161922 A1* | 6/2016 | Shin | | G06F 1/163 |
| | | | | 368/82 |
| 2016/0179353 A1* | 6/2016 | Iskander | | G06F 3/04847 |
| | | | | 715/765 |
| 2016/0182613 A1* | 6/2016 | Brune | | H04L 67/10 |
| | | | | 709/217 |
| 2017/0010014 A1* | 1/2017 | Miyata | | G05B 15/02 |

FOREIGN PATENT DOCUMENTS

EP     3101881 A1    12/2015
WO     2017003043 A1  1/2017

\* cited by examiner

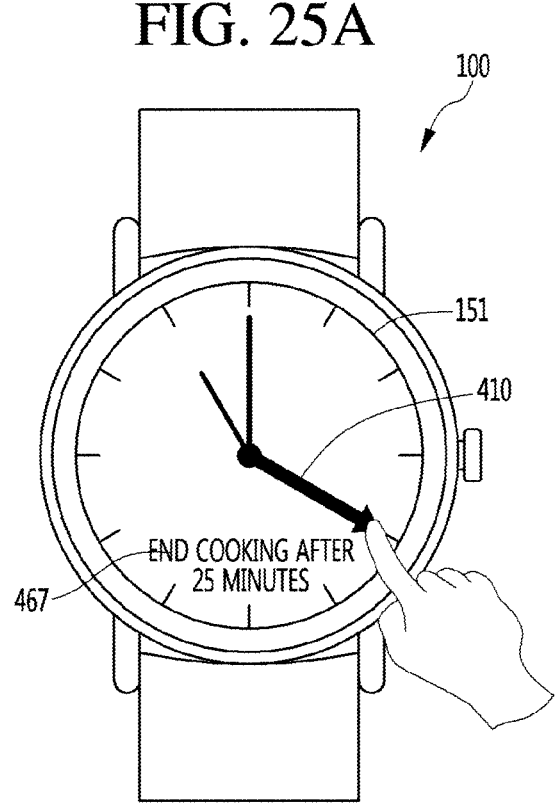

WATCH-TYPE MOBILE TERMINAL AND METHOD OF OPERATING THE SAME

CROSS-REFERENCE TO RELATED APPLICATION

Pursuant to 35 U.S.C. § 119(a), this application claims the benefit of earlier filing date and right of priority to Korean Patent Application No. 10-2015-0149772, filed on Oct. 27, 2015, the contents of which are hereby incorporated by reference herein in its entirety.

BACKGROUND OF THE INVENTION

1. Field of the Invention

The present disclosure relates to a watch-type mobile terminal, and more particularly, to a watch-type mobile terminal connected to an external device and capable of controlling an event occurring in the external device, and a method of operating the same.

2. Description of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A mobile terminal may be used in a state of being grasped by a user's hand and may be used as a wearable device worn on a user's body. Examples of such a wearable device include a watch-type mobile terminal, a glasses-type mobile terminal, a head mounted display (HMD), etc.

The watch-type mobile terminal is obtained by adding an electronic function, a communication function, a multimedia function, etc. to a watch worn on a wrist of a person and is expected to form an explosively growing market because people are not hostile thereto.

Therefore, research into development and commercialization of a watch-type mobile terminal is underway.

SUMMARY OF THE INVENTION

Therefore, the present disclosure has been made in view of the above problems, and it is an object of the present disclosure to provide a watch-type mobile terminal connected to an external device and capable of controlling an event occurring in the external device.

According to an embodiment of the present disclosure, a watch-type mobile terminal capable of adjusting an occurrence time of an event for an external device includes a wireless communication unit for receiving information related to the occurrence time of the event from the external device, a display unit for displaying a clock screen, and a controller for displaying a first item corresponding to the event at a position corresponding to the occurrence time on the clock screen based on the received information.

The controller may receive a request for adjusting the occurrence time of the event based on the displayed first item, and move and display the first item to and at a position corresponding to an adjusted occurrence time on the clock screen in response to the received request.

The controller may transmit the received request for adjusting the occurrence time of the event to the external device.

The external device may be a display device, and, if the display device is used while a connection between the watch-type mobile terminal and the display device is released, the controller may receive information related to a period of use of the display device from the display device when the watch-type mobile terminal and the display device are reconnected, and display a second item corresponding to the received information at a position corresponding to the period of use on the clock screen.

The controller may receive at least one of information related to an application executed by the display device during release of the connection and information related to an accessed file from the display device, and display at least one second item corresponding to at least one of the received information on the clock screen.

The controller may receive a request for displaying detailed information of any one of the at least one displayed second item, and display information corresponding to the second item in response to the received request for displaying the detailed information.

The external device may be a display device, and, if a distance between the watch-type mobile terminal and the display device is greater than a reference distance and use of the display device is sensed, the controller may receive a notification indicating use of the display device from the display device, display the received notification indicating use of the display device on the display unit, and transmit a received wait screen change command or use history storage command to the display device based on the displayed notification indicating use of the display device. The wait screen change command may be a command for performing control to change a screen of the display device to a wait screen and the use history storage command may be a command for performing control to store the use history of the display device.

The watch-type mobile terminal may further include a motion sensor for sensing a motion of the watch-type mobile terminal, the external device may be a display device, and the controller may sense the motion of the watch-type mobile terminal using the motion sensor, and transmit a request for releasing the wait screen to the display device if the sensed motion is equal to a predetermined wait screen release motion.

The controller may receive a request for selecting the first item, display an operation setting window for setting operation of the external device after the event occurs in response to the received request, and transmit a command corresponding to the operation set based on the displayed operation setting window to the external device.

The controller may receive a request for selecting any one of at least one operation setting icon included in the operation setting window, display a time setting window for setting a time of operation corresponding to the selected operation setting icon in response to the received request, and transmit the command including operation time information set based on the displayed time setting window to the external device.

According to another aspect of the present disclosure, a method of operating a watch-type mobile terminal capable of adjusting an occurrence time of an event for an external device includes connecting the external device, receiving information related to the occurrence time of the event from the external device, and displaying a first item corresponding to the event at a position corresponding to the occurrence time on the clock screen displayed on a display unit based on the received information.

According to another aspect of the present disclosure, a computer-readable recording medium has a computer program recorded thereon that executes the method.

The watch-type mobile terminal according to the embodiment of the present invention can display the item indicating the occurrence time of the event for the external device connected to the watch-type mobile terminal and easily and conveniently control the occurrence time of the event based on the displayed item.

BRIEF DESCRIPTION OF THE DRAWINGS

The above and other objects, features and other advantages of the present invention will be more clearly understood from the following detailed description taken in conjunction with the accompanying drawings, in which:

FIGS. 25a to 25d are diagrams showing operation for controlling an event for an oven using the watch-type mobile terminal according to the embodiment shown in FIG. 18.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
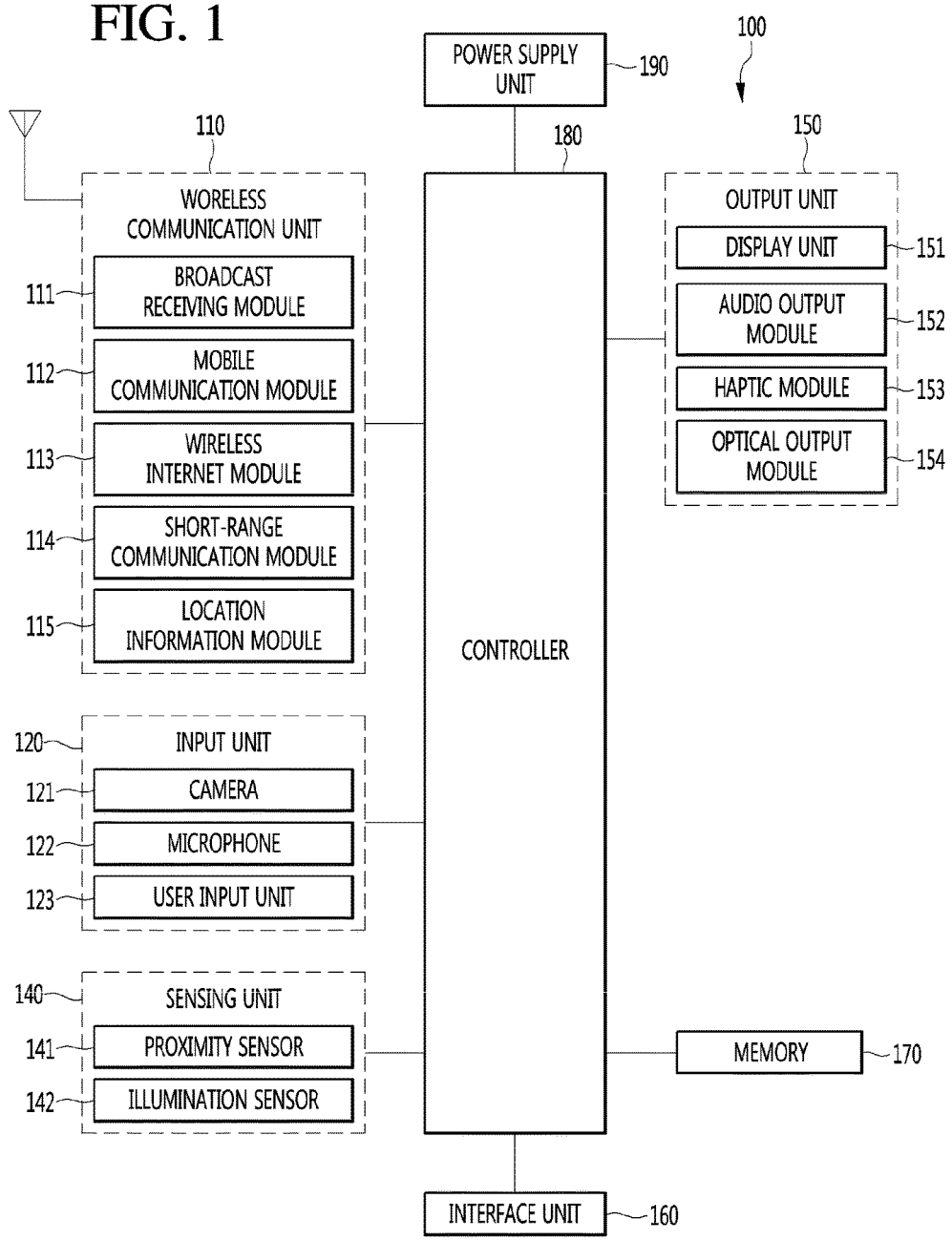
FIG. 1 is a block diagram of a watch-type mobile terminal in accordance with the present disclosure.

FIG. 1 is a block diagram of a watch-type mobile terminal in accordance with the present disclosure, and FIGS. 1B and 1C are conceptual views of one example of the watch-type mobile terminal, viewed from different directions.

The watch-type mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the watch-type mobile terminal 100 is shown having wireless communication unit 110 configured with several commonly implemented components. For instance, the wireless communication unit 110 typically includes one or more components which permit wireless communication between the watch-type mobile terminal 100 and a wireless communication system or network within which the watch-type mobile terminal is located.

The wireless communication unit 110 typically includes one or more modules which permit communications such as wireless communications between the watch-type mobile terminal 100 and a wireless communication system, communications between the watch-type mobile terminal 100 and another mobile terminal, communications between the watch-type mobile terminal 100 and an external server. Further, the wireless communication unit 110 typically includes one or more modules which connect the watch-type mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the watch-type mobile terminal, the surrounding environment of the watch-type mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The watch-type mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the watch-type mobile terminal 100 and a user, as well as function as the user input unit 123 which provides an input interface between the watch-type mobile terminal 100 and the user.

The interface unit 160 serves as an interface with various types of external devices that can be coupled to the watch-type mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the watch-type mobile terminal 100 may perform assorted control functions associated with a connected external device, in response to the external device being connected to the interface unit 160.

The memory 170 is typically implemented to store data to support various functions or features of the watch-type mobile terminal 100. For instance, the memory 170 may be configured to store application programs executed in the watch-type mobile terminal 100, data or instructions for operations of the watch-type mobile terminal 100, and the like. Some of these application programs may be downloaded from an external server via wireless communication. Other application programs may be installed within the watch-type mobile terminal 100 at time of manufacturing or shipping, which is typically the case for basic functions of the watch-type mobile terminal 100 (for example, receiving a call, placing a call, receiving a message, sending a message, and the like). It is common for application programs to be stored in the memory 170, installed in the watch-type mobile terminal 100, and executed by the controller 180 to perform an operation (or function) for the watch-type mobile terminal 100.

The controller 180 typically functions to control overall operation of the watch-type mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the watch-type mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the watch-type mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the watch-type mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch-type mobile terminal 100 and a wireless communication system, communications between the watch-type mobile terminal 100 and another mobile terminal, or communications between the watch-type mobile terminal and a network where another mobile terminal (or an external server) is located, via wireless area networks. One example of the wireless area networks is a wireless personal area networks.

In some embodiments, another mobile terminal (which may be configured similarly to watch-type mobile terminal 100) may be a wearable device, for example, a smart watch, a smart glass or a head mounted display (HMD), which is able to exchange data with the watch-type mobile terminal 100 (or otherwise cooperate with the watch-type mobile terminal 100). The short-range communication module 114 may sense or recognize the wearable device, and permit communication between the wearable device and the watch-type mobile terminal 100. In addition, when the sensed wearable device is a device which is authenticated to communicate with the watch-type mobile terminal 100, the controller 180, for example, may cause transmission of data processed in the watch-type mobile terminal 100 to the wearable device via the short-range communication module 114. Hence, a user of the wearable device may use the data processed in the watch-type mobile terminal 100 on the wearable device. For example, when a call is received in the watch-type mobile terminal 100, the user may answer the call using the wearable device. Also, when a message is received in the watch-type mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the watch-type mobile terminal uses a GPS module, a position of the watch-type mobile terminal may be acquired using a signal sent from a GPS satellite. As another example, when the watch-type mobile terminal uses the Wi-Fi module, a position of the watch-type mobile terminal can be acquired based on information related to a wireless access point (AP) which transmits or receives a wireless signal to or from the Wi-Fi module.

The input unit 120 may be configured to permit various types of input to the watch-type mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the watch-type mobile terminal 100. As another example, the cameras 121 may be located in a stereoscopic arrangement to acquire left and right images for implementing a stereoscopic image.

The microphone 122 is generally implemented to permit audio input to the watch-type mobile terminal 100. The audio input can be processed in various manners according to a function being executed in the watch-type mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the watch-type mobile terminal 100. The user input unit 123 may include one or more of a mechanical input element (for example, a key, a button located on a front and/or rear surface or a side surface of the watch-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the watch-type mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the watch-type mobile terminal, surrounding environment information of the watch-type mobile terminal, user information, or the like. The controller 180 generally cooperates with the sending unit 140 to control operation of the watch-type mobile terminal 100 or execute data processing, a function or an operation associated with an application program installed in the watch-type mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the watch-type mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the watch-type mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the watch-type mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch-type mobile terminal 100. For example, the display unit 151 may display execution screen information of an application program executing at the watch-type mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the watch-type mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the watch-type mobile terminal 100.

An optical output module 154 can output a signal for indicating an event generation using light of a light source. Examples of events generated in the watch-type mobile terminal 100 may include message reception, call signal reception, a missed call, an alarm, a schedule notice, an email reception, information reception through an application, and the like.

A signal output by the optical output module 154 may be implemented in such a manner that the watch-type mobile terminal emits monochromatic light or light with a plurality of colors. The signal output may be terminated as the watch-type mobile terminal senses that a user has checked the generated event, for example.

The interface unit 160 serves as an interface for external devices to be connected with the watch-type mobile terminal 100. For example, the interface unit 160 can receive data transmitted from an external device, receive power to transfer to elements and components within the watch-type mobile terminal 100, or transmit internal data of the watch-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the watch-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the watch-type mobile terminal 100 is connected with an external cradle, the interface unit 160 can serve as a passage to allow power from the cradle to be supplied to the watch-type mobile terminal 100 or may serve as a passage to allow various command signals input by the user from the cradle to be transferred to the watch-type mobile terminal there through. Various command signals or power input from the cradle may operate as signals for recognizing that the watch-type mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch-type mobile terminal 100 may also be operated in relation to a network storage device that performs the storage function of the memory 170 over a network, such as the Internet.

The controller 180 may typically control the general operations of the watch-type mobile terminal 100. For example, the controller 180 may set or release a lock state for restricting a user from inputting a control command with respect to applications when a status of the watch-type mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the watch-type mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Next, a communication system which may be implemented through the watch-type mobile terminal 100 according to the present invention will be described.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the watch-type mobile terminals 100 operating within the system. The broadcast receiving module 111 of FIG. 1A is typically configured inside the watch-type mobile terminal 100 to receive broadcast signals transmitted by the BT.

Global Positioning System (GPS) satellites for locating the position of the watch-type mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the watch-type mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the watch-type mobile terminal.

A typical GPS module 115 can measure an accurate time and distance from three or more satellites, and accurately calculate a current location of the watch-type mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the watch-type mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the watch-type mobile terminal 100. This technology typically includes the use of a Wi-Fi module in the watch-type mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the watch-type mobile terminal 100, based on the location information request message (or signal) of the watch-type mobile terminal 100. The information of the wireless AP may be transmitted to the Wi-Fi location determination server through the watch-type mobile terminal 100, or may be transmitted to the Wi-Fi location determination server from the wireless AP.

The information of the wireless AP extracted based on the location information request message of the watch-type mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the watch-type mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the watch-type mobile terminal 100 using at least one wireless AP information extracted from the database.

A method for extracting (analyzing) location information of the watch-type mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the watch-type mobile terminal 100 through the Wi-Fi location determination server, thereby acquiring location information of the watch-type mobile terminal 100.

The watch-type mobile terminal 100 can acquire location information by being connected to at least one wireless AP. The number of wireless APs required to acquire location information of the watch-type mobile terminal 100 may be variously changed according to a wireless communication environment within which the watch-type mobile terminal 100 is positioned.

Various embodiments described herein may be implemented in a computer-readable medium, a machine-readable medium, or similar medium using, for example, software, hardware, or any combination thereof.

Figure 2:
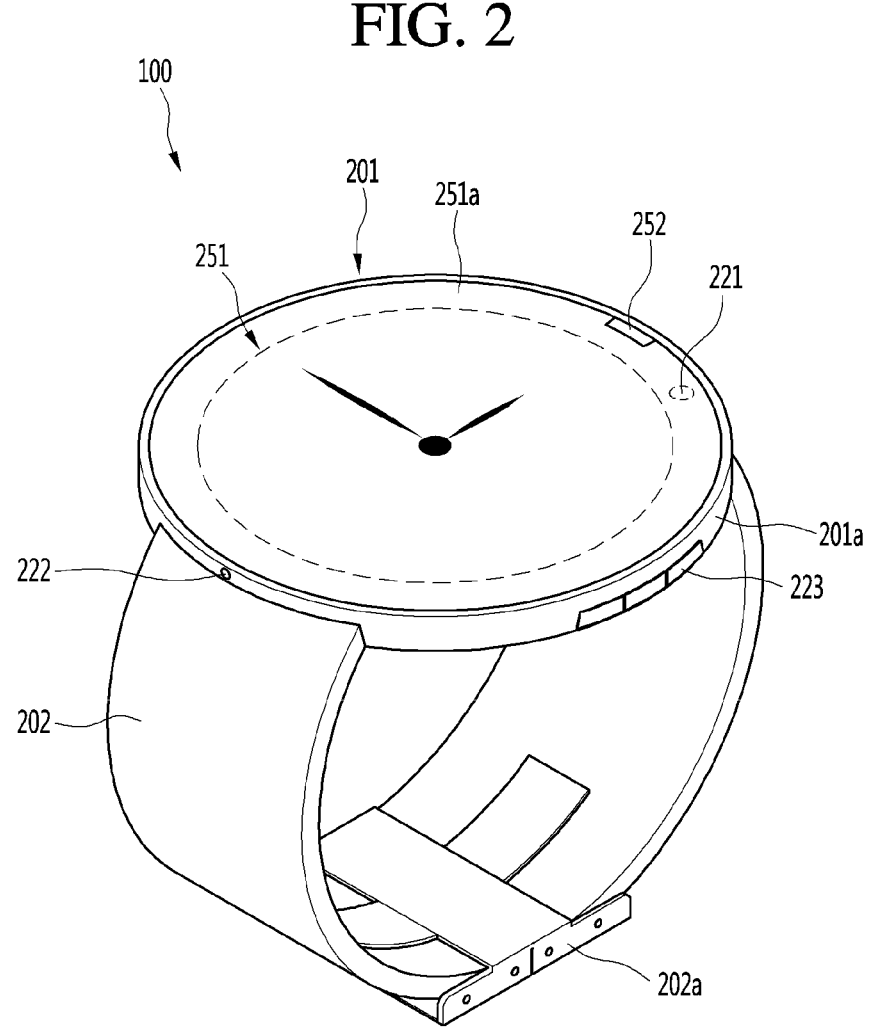
FIG. 2 is a perspective view showing an embodiment of the watch-type mobile terminal shown in FIG. 1.

FIG. 2 is a perspective view showing an embodiment of the watch-type mobile terminal shown in FIG. 1.

Although the display unit (or the touchscreen) 251 of the watch-type mobile terminal shown in FIG. 2 has a circular shape, the present disclosure is not limited thereto and the display unit may have an elliptical shape or a rectangular shape. The display unit 251 of the present disclosure may have a shape for providing a visually superior image to a user and capable of aiding the user in manipulating the display unit 251.

As illustrated in FIG. 2, the watch-type mobile terminal 100 includes a main body 201 with a display unit 251 and a band 202 connected to the main body 201 to be wearable on a wrist. In general, watch-type mobile terminal 100 may be configured to include features that are the same or similar to that of watch-type mobile terminal 100 of FIG. 1.

The main body 201 may include a case having a certain appearance. As illustrated, the case may include a first case 201*a* and a second case 201*b* cooperatively defining an inner space for accommodating various electronic components. Other configurations are possible. For instance, a single case may alternatively be implemented, with such a case being configured to define the inner space, thereby implementing a mobile terminal 100 with a uni-body.

The watch-type mobile terminal 100 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251*a* is positioned on the first case 201*a* to form a front surface of the terminal body together with the first case 201*a*.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

Although the buttons provided at the side surface of the watch-type mobile terminal 100 are shown as the embodiment of the user input unit 223 in FIG. 2, the user input unit 223 is not limited thereto and may be implemented by the crown of a watch, a rotational bezel, etc.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202*a*. The fastener 202*a* may be implemented into a buckle type, a snap-fit hook structure, a Velcro® type, or the like, and include a flexible section or material. The drawing illustrates an example that the fastener 302*a* is implemented using a buckle.

Figure 3:
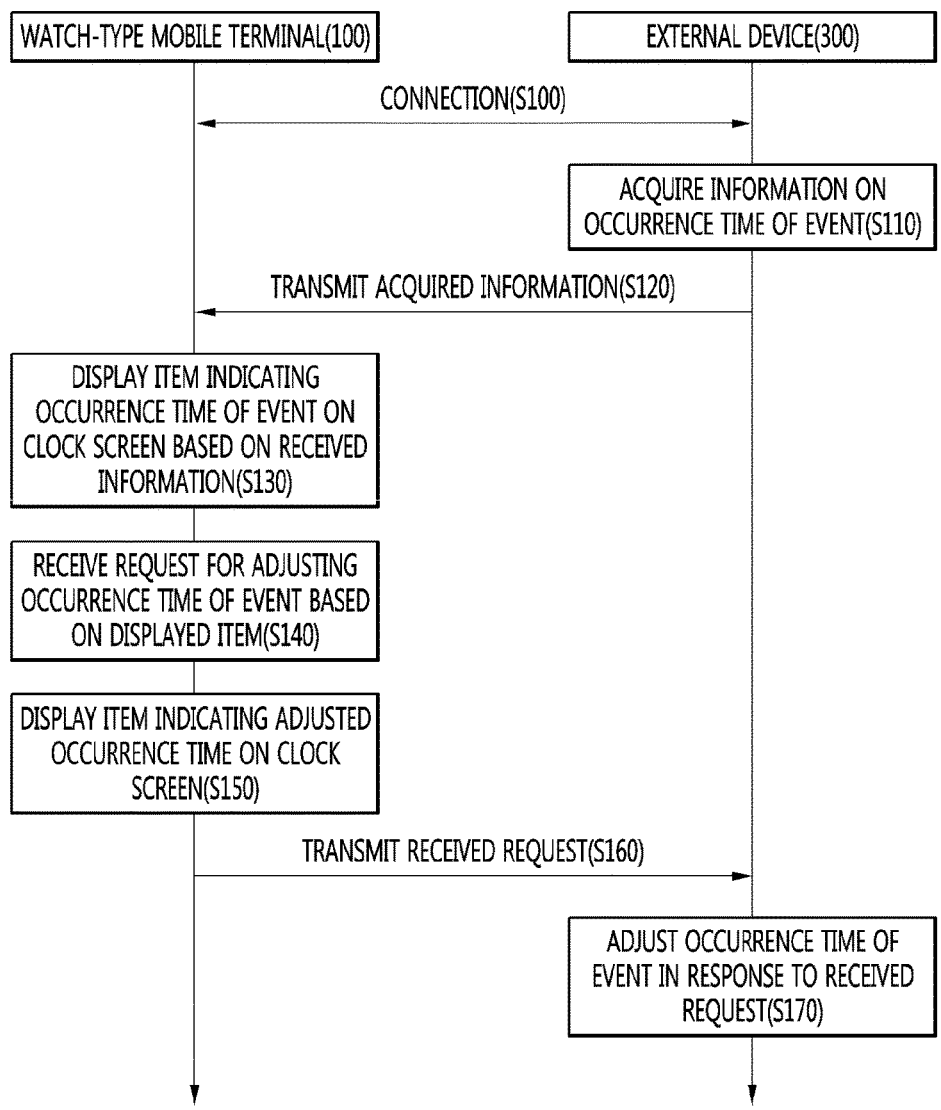
FIG. 3 is a ladder diagram illustrating a method of operating a system including a watch-type mobile terminal according to an embodiment of the present disclosure.

FIG. 3 is a ladder diagram illustrating a method of operating a system including a watch-type mobile terminal according to an embodiment of the present disclosure.

Referring to FIG. 3, the watch-type mobile terminal 100 according to the embodiment of the present disclosure may be connected to an external device 300 to configure a system (S100). The watch-type mobile terminal 100 is connected to the external device 300 through the wireless communication unit 110 to transmit or receive signals, data or information.

For example, the watch-type mobile terminal 100 may be connected to the external device 300 using the short-range communication module 114 included in the wireless communication unit 110. In particular, when the short-range communication module 114 includes a Bluetooth module, the watch-type mobile terminal 100 may pair with the external device 300 using the Bluetooth module. Although not shown, the external device 300 may also include the wireless communication unit for connection with the watch-type mobile terminal 100.

The external device 300 may acquire information related to an occurrence time of an event occurring in the external device 300 (S110). The event may mean that a specific operation starts in the external device 300 or that an operation performed by the external device 300 ends and may be various events related to operation of the external device 300.

In some embodiments, the external device 300 or the controller of the external device 300 may calculate and predict the occurrence time of the event and acquire information related to the occurrence time of the event. For example, when specific operation is being performed in the external device 300, the external device 300 may calculate and predict an end time of the performed operation and acquire information related to an occurrence time of an event corresponding to end of the operation.

The external device 300 may transmit the acquired information to the watch-type mobile terminal 100 (S120). The external device 300 may periodically update and transmit the acquired information, or transmit the acquired information by a specific number of times at a time earlier than the occurrence time of the event by a predetermined reference time or periodically update and transmit the acquired information before the reference time. In some embodiments, the external device 300 may transmit a variety of information (event type, information on operation set after event occurrence, etc.) on the event to the watch-type mobile terminal 100, in addition to the acquired information.

The controller 180 of the watch-type mobile terminal 100 may display an item indicating the occurrence time of the event on a clock screen displayed on the display unit 151 based on information received from the external device 300 (S130). For example, if the clock screen is an analog clock screen, the item is displayed at a position corresponding to the occurrence time of the event on the clock screen, such that the occurrence time of the event is intuitively displayed. That is, the item may correspond to the event.

Although the embodiment in which the clock screen is an analog clock screen is shown in this specification, the present disclosure can be modified within a range conceivable by those skilled in the art and is applicable to a case in which the clock screen is a digital clock screen.

The controller 180 of the watch-type mobile terminal 100 may receive a request for adjusting the occurrence time of the event based on the item displayed on the clock screen of the display unit 151 (S140).

The request is to adjust (advance or delay) the occurrence time of the event and may be implemented in various forms such as touch input (including a variety of touch input such as short touch input, long touch input or touch drag input), voice input, keypad input, etc. The controller 180 may receive the request through the input unit 120 such as the microphone 122, the user input unit 123 and a touchscreen.

The controller 180 may display the item indicating the occurrence time of the event adjusted based on the received request on the clock screen (S150). That is, as the occurrence time of the event is adjusted, the item may also be changed and displayed. For example, the display position of the item may be moved to the position corresponding to the adjusted occurrence time of the event.

The controller 180 may transmit the received request to the external device 300 (S160). Although the received request is shown as being transmitted to the external device 300 after the item indicating the occurrence time of the event adjusted in step S150 is displayed on the clock screen in FIG. 3, steps S150 and S160 may be simultaneously performed or step S160 may be performed first and then step S150 may be performed, in some embodiments.

The external device 300 may adjust the occurrence time of the event in response to the request received from the watch-type mobile terminal 100 (S170). In some embodiments, the external device 300 may transmit the information related to the adjusted occurrence time to the watch-type mobile terminal 100. In this case, the controller 180 of the watch-type mobile terminal 100 may display the item indicating the adjusted occurrence time on the clock screen in response to the information related to the adjusted occurrence time received from the external device 300 without performing step S150.

Figure 16:
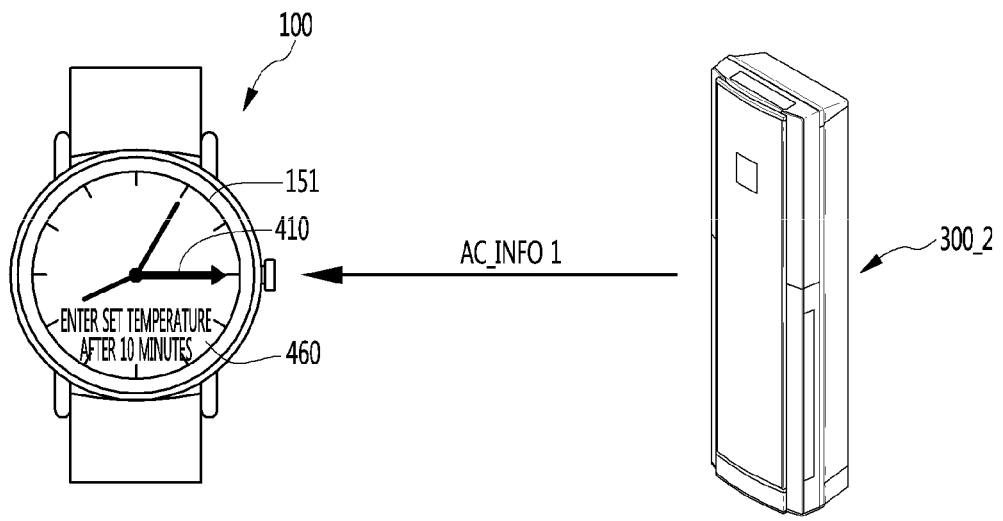
FIGS. 16 to 17b are diagrams showing a case in which the external device of FIG. 3 is an air conditioner.
Figure 20:
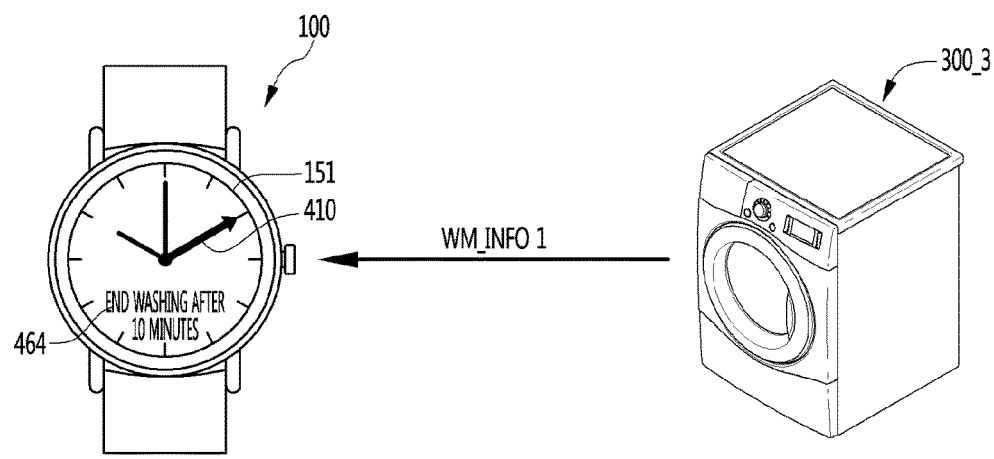
FIGS. 20 to 21b are diagrams showing a case in which the external device of FIG. 3 is a washing machine.
Figure 23:
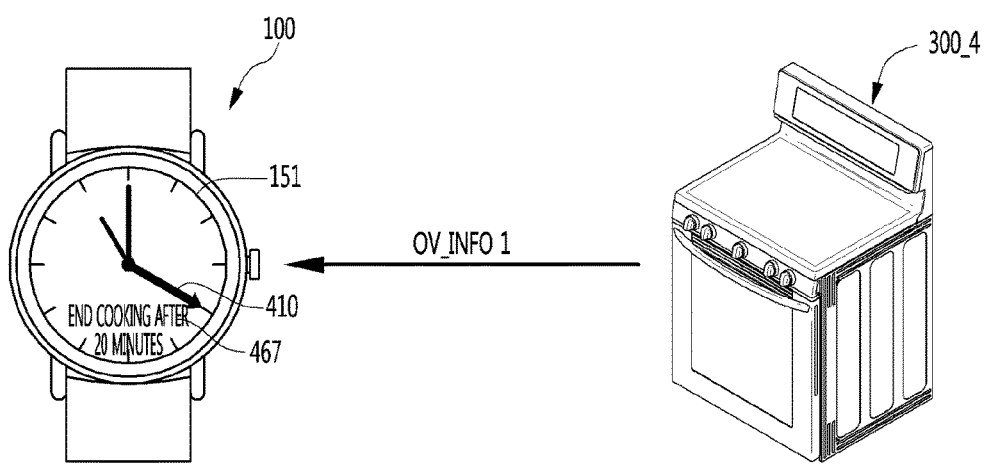
FIGS. 23 to 24b are diagrams showing a case in which the external device of FIG. 3 is an oven.

The embodiments of the steps shown in FIG. 3 will be described in greater detail using the subsequent figures. In particular, FIGS. 5a to 6b show an embodiment in which the external device 300 of FIG. 3 is a display device 300_1, FIGS. 16 to 17b show an embodiment in which the external device 300 is an air conditioner 300_2, FIGS. 20 to 21b show an embodiment in which the external device 300 is a washing machine 300_3, and FIGS. 23 to 24b show an embodiment in which the external device 300 is an oven 300_4.

Figure 4:
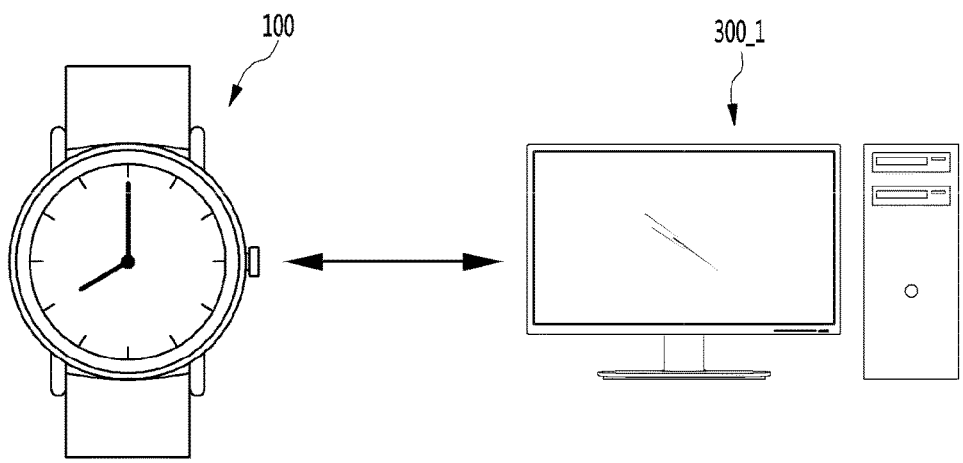
FIG. 4 is a diagram showing an example in which the external device shown in FIG. 3 is a display device.

FIG. 4 is a diagram showing an example in which the external device shown in FIG. 3 is a display device.

Referring to FIG. 4, the watch-type mobile terminal 100 may be connected to the display device 300_1. Although the display device 300_1 is shown as a personal computer (PC) in this specification, the display device 300_1 may include a monitor or a laptop in addition to the PC.

The watch-type mobile terminal 100 may be connected to the display device 300_1 to adjust the occurrence time of the event for the display device 300_1. For example, the event for the display device 300_1 may mean wait screen change/release operation of the display device 300_1 and the occurrence time of the event may mean a wait screen change/release time of the display device 300_1. The wait screen change/release operation may mean operation for changing a screen displayed on the display device 300_1 to a screensaver or releasing the screensaver or operation for changing the display device 300_1 to a sleep mode or releasing the sleep mode.

The wait screen may mean a pre-set screen displayed on the display device 300_1 instead of an operation screen such as a content or home screen.

Operation for adjusting the wait screen change/switch time of the display device 300_1 at the watch-type mobile terminal 100 will now be described in detail with reference to FIGS. 5a to 6b.

Figure 5A:
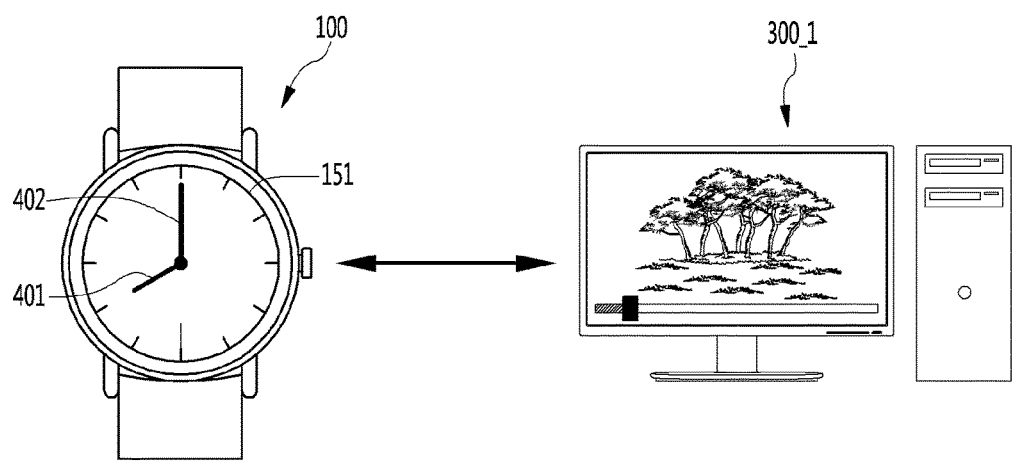
FIGS. 5a and 5b are diagrams showing an embodiment of operation for displaying an item indicating an occurrence time of an event for a display device using a watch-type mobile terminal shown in FIG. 4.
Figure 5B:
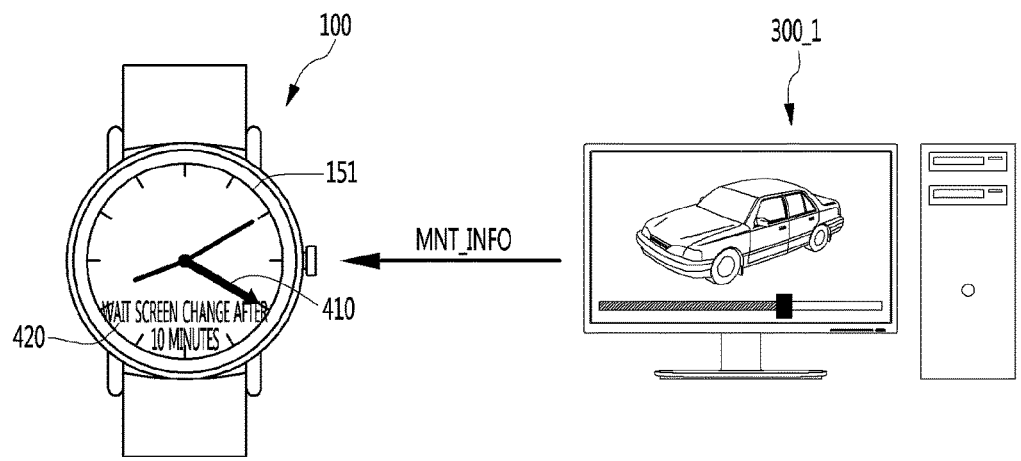

FIGS. 5a and 5b are diagrams showing an example of operation for displaying an item indicating an occurrence time of an event for a display device using a watch-type mobile terminal shown in FIG. 4.

Referring to FIG. 5a, the controller 180 of the watch-type mobile terminal 100 may display a clock screen indicating a current time on the display unit 151. The clock screen includes an hour hand 401 and a minute hand 402, and the hour hand 401 and the minute hand 402 may be displayed at positions corresponding to the current time.

The controller of the display device 300_1 connected to the watch-type mobile terminal 100 may change the screen currently displayed on the display unit to a wait screen (e.g., a screensaver) and display the wait screen, when the display device 300_1 does not receive a command or request for a predetermined time. The command or request may be received by the controller of the display device 300_1 through various input devices such as a mouse or a keyboard, without being limited thereto.

For example, as shown in FIGS. 5a and 5b, when the display device 300_1 does not receive a command or request for a predetermined time, even if multimedia content such as a moving image is being reproduced on the display device 300_1, the display device 300_1 may change a screen, on which the multimedia content is reproduced, to the wait screen and display the wait screen. Accordingly, in order to prevent the screen, on which the multimedia content is reproduced, from being changed to the wait screen, the user may experience inconvenience of having to periodically input a specific request or command through an input device.

Referring to FIG. 5b, the watch-type mobile terminal 100 may receive information MNT_INFO related to a wait screen change time from the display device 300_1.

The display device 300_1 may acquire the information MNT_INFO related to the wait screen change time depending on whether the display device 300_1 receives a command or request. For example, the controller of the display device 300_1 may acquire the information MNT_INFO by calculating and predicting the wait screen change time based on a reception time of a recently received command or request.

The display device 300_1 may transmit the acquired information MNT_INFO related to the wait screen change time to the watch-type mobile terminal 100.

In some embodiments, the display device 300_1 may periodically acquire the information MNT_INFO and periodically transmit the acquired information MNT_INFO to the watch-type mobile terminal 100.

In another embodiment, the display device 300_1 may transmit the information MNT_INFO to the watch-type mobile terminal 100 when a reference time has elapsed after the reception time of the recently received command or request. For convenience of description, as an example, if the predetermined time for changing to the wait screen is "20 min" and the reference time is set to "10 min", the display device 300_1 may transmit the information MNT_INFO to the watch-type mobile terminal 100 when "10 min" has elapsed after the reception time of the recently received command or request.

The controller 180 of the watch-type mobile terminal 100 may display an item 410 corresponding to the wait screen change time on the clock screen based on the received information MNT_INFO. The item 410 may be displayed at the position of the clock screen corresponding to the wait screen change time so as to intuitively indicate the wait screen change time.

In some embodiments, the controller 180 may or may not display the item 410 on the clock screen based on a difference between a time when the information MNT_INFO is received from the display device 300_1 and the wait screen change time. For example, if the time when the information MNT_INFO is received from the display device 300_1 (e.g., "8:05") is not within the reference time ("10 min") from the wait screen change time (e.g., "8:20"), the controller 180 may not display the item 410 on the clock screen. In contrast, as shown in FIG. 5*b*, if the time when the information MNT_INFO is received from the display device 300_1 (e.g., "8:10") is within the reference time ("10 min") from the wait screen change time (e.g., "8:20"), the controller 180 may display the item 410 on the clock screen.

In some embodiments, the controller 180 may further display a notification message 420 indicating the wait screen change time on the clock screen based on the current time and the wait screen change time. The controller 180 may calculate a difference between the wait screen change time and the current time and display the notification message 420 indicating that the display device 300_1 is changed to the wait screen after a time corresponding to the calculated difference.

Figure 6A:
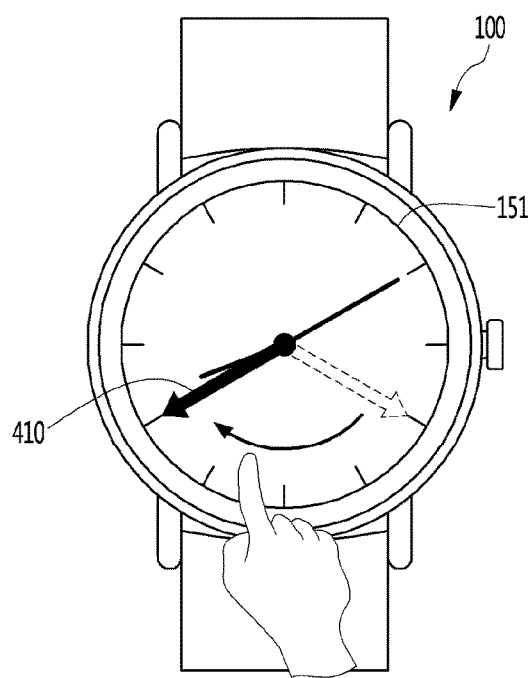
FIGS. 6a and 6b are diagrams showing an embodiment of operation for controlling an occurrence time of an event for a display device based on the item displayed on the watch-type mobile terminal of FIG. 5b.
Figure 6B:
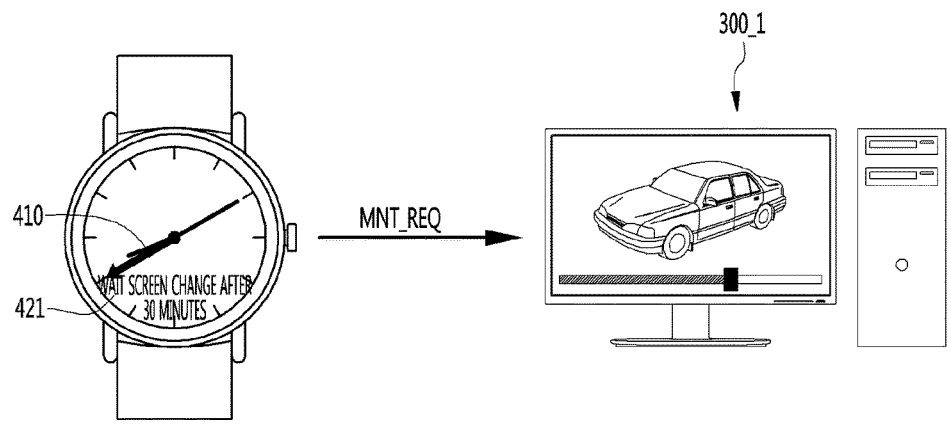

FIGS. 6*a* and 6*b* are diagrams showing an embodiment of operation for controlling an occurrence time of an event for a display device based on the item displayed on the watch-type mobile terminal of FIG. 5*b*.

Referring to FIGS. 6*a* and 6*b*, the controller 180 may display the item 410 in correspondence with the adjusted wait screen change time included in the request in response to a request for adjusting an event occurrence time (wait screen change time) received by the watch-type mobile terminal 100 based on the item 410 displayed on the clock screen of the display unit 151. For example, the controller 180 may move the item 410 to the position of the clock screen corresponding to the adjusted wait screen change time and display the item 410. In some embodiments, the controller 180 may display a notification message 421 updated based on the request for adjusting the wait screen change time.

Referring to FIG. 6*b*, the controller 180 may transmit the received request MNT_REQ for adjusting the wait screen change time to the display device 300_1. As described above with reference to FIG. 3, the controller 180 may variously change the order of operation for moving and displaying the item 410 and an operation for transmitting the request MNT_REQ for adjusting the wait screen change time to the display device 300_1.

The controller of the display device 300_1 may change the wait screen change time of the display device 300_1 in response to the received request MNT_REQ for adjusting the wait screen change time. As shown in FIGS. 6*a* and 6*b*, if the request MNT_REQ for adjusting the wait screen change time is a request for delaying the wait screen change time from "8:20" to "8:40", the controller of the display device 300_1 may perform control to prevent the screen of the display device 300_1 from being changed to the wait screen until "8:40".

That is, the user of the watch-type mobile terminal 100 may check the wait screen change time of the display device 300_1 in advance based on the item 410 displayed on the clock screen of the watch-type mobile terminal 100 and conveniently adjust the wait screen change time.

Figure 7:
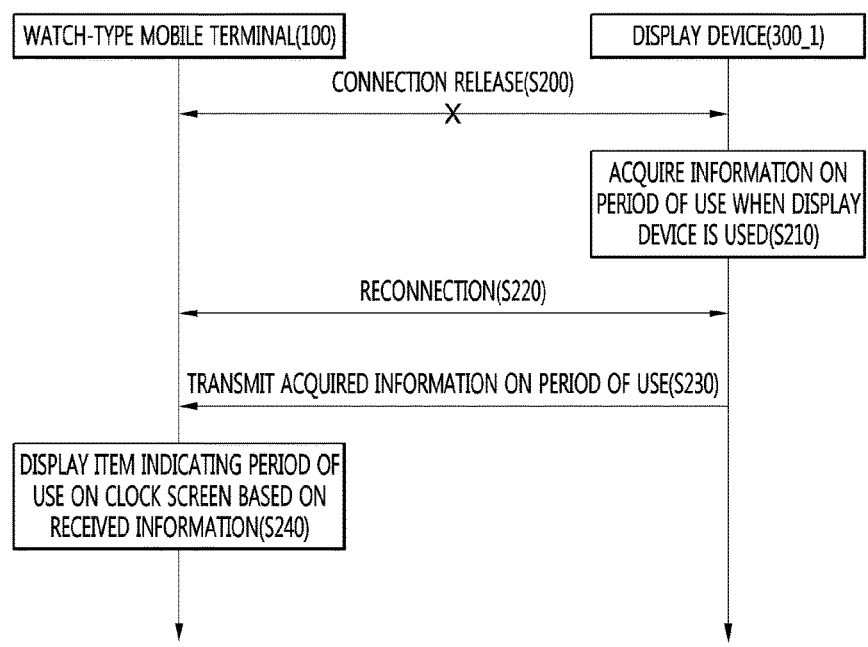
FIG. 7 is a ladder diagram illustrating an operation method according to another embodiment of the system shown in FIG. 4.

FIG. 7 is a ladder diagram illustrating an operation method according to another embodiment of the system shown in FIG. 4.

Referring to FIG. 7, as the watch-type mobile terminal 100 is too far from the display device 300_1 to be connected to the display device 300-1, the connection between the watch-type mobile terminal 100 and the display device 300_1 may be released (S200). For example, when the watch-type mobile terminal 100 is connected to the display device 300_1 using the short-range communication module 114, if the distance between the watch-type mobile terminal 100 and the display device 300_1 is greater than a connectable distance due to movement of the user of the watch-type mobile terminal 100, the connection between the watch-type mobile terminal 100 and the display device 300_1 may be released.

If the display device 300_1 is used while the connection with the watch-type mobile terminal 100 is released, the display device 300_1 may acquire information on a period of use (S210). Use of the display device 300_1 may mean that a request for executing a specific application (or program) installed in the display device 300_1 is received or a request for accessing various files (documents, images, etc.) stored in the display device 300_1 is received through various input devices connected to the display device 300_1.

If it is assumed that the user of the watch-type mobile terminal 100 and the user of the display device 300_1 are equal, as the user moves away from the display device 300_1, the user cannot use the display device 300_1 and the connection between the watch-type mobile terminal 100 and the display device 300_1 may be released. Nevertheless, when the display device 300_1 is used, the controller of the display device 300_1 may determine that the display device 300_1 is used by another person. In this case, the controller of the display device 300_1 may generate and acquire information on the period of use of the display device 300_1.

In some embodiments, the controller of the display device 300_1 may further acquire information related to accessed files among the files (documents, content, etc.) stored in the display device 300_1 or information related to an application (or program) executed in the display device 300_1.

When the watch-type mobile terminal 100 and the display device 300_1 are connected again as the user of the watch-type mobile terminal 100 becomes close to the display device 300_1, the display device 300_1 may transmit the information on the period of use of the display device 300_1 acquired during connection release to the watch-type mobile terminal 100 (S230). In some embodiments, the display device 300_1 may transmit information related to the accessed files among the files stored in the display device 300_1 or the information related to the application (or program) executed during connection release to the watch-type mobile terminal 100.

The controller 180 of the watch-type mobile terminal 100 may display an item indicating the period of use on the clock screen based on the information on the period of use received from the display device 300_1 (S240). In some embodiments, the controller 180 may further display the information related to the accessed files or the information related to the executed application.

Step S240 will be described in greater detail with reference to FIGS. 8a to 8c.

Figure 8A:
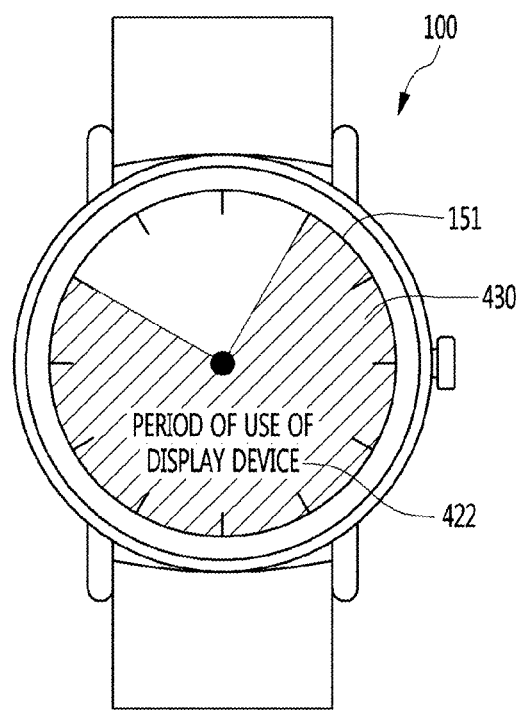
FIGS. 8a to 8c are diagrams illustrating operation of the watch-type mobile terminal shown in FIG. 7.
Figure 8B:
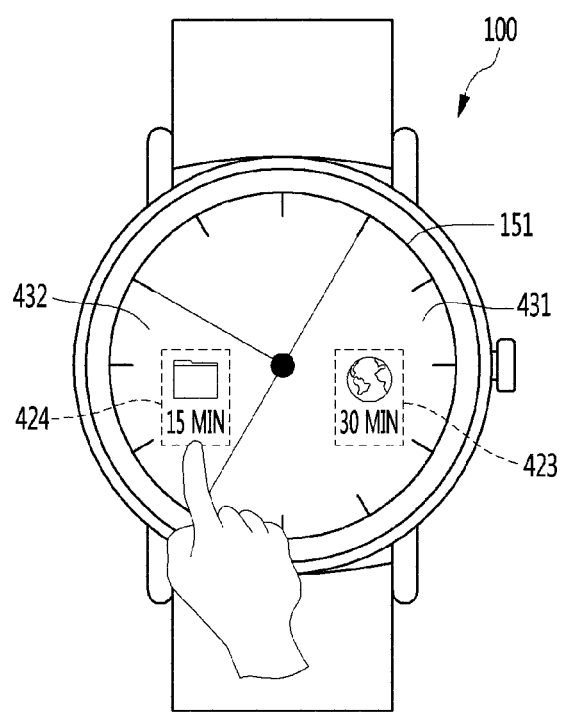
Figure 8C:
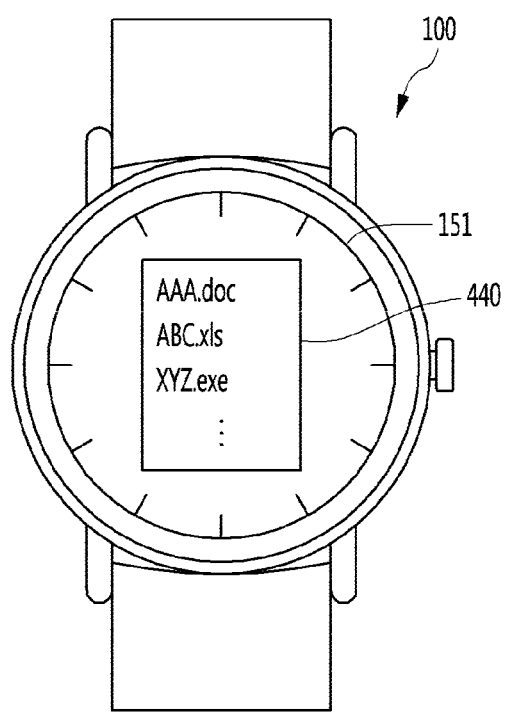

FIGS. 8a to 8c are diagrams illustrating operation of the watch-type mobile terminal shown in FIG. 7.

Referring to FIG. 8a, when the display device 300_1 is used while the connection between the watch-type mobile terminal 100 and the display device 300_1 is released, the watch-type mobile terminal 100 may receive information on the period of use of the display device 300_1 during release connection with the reconnected display device 300_1, The controller 180 may display the item 430 indicating the period of use on the clock screen displayed on the display unit 151 based on the information on the received period of use. The item 430 may be displayed on the clock screen in correspondence with the period of use, that is, a range between a use start time and a use end time, as shown in FIG. 8a.

For example, when the connection between the watch-type mobile terminal 100 and the display device 300_1 is released from "13:00" to "14:00" and another person uses the display device 300_1 from "13:05" to "13:50", the item 430 displayed on the clock screen may correspond to a range from a position corresponding to "5 min" to a position corresponding to "50 min".

In some embodiments, when the watch-type mobile terminal 100 further receives the information related to the application executed in the display device 300_1 and/or the information related to the accessed files, the controller 180 may display the items 431 and 432 respectively indicating a period for using the application or a period for accessing the files on the clock screen as shown in FIG. 8b. The controller 180 may further include icons (an application icon or a file related icon) 423 and 424 respectively corresponding to the items 431 and 432.

In some embodiments, the items 431 and 432 shown in FIG. 8b may be displayed in response to a request received based on the item 430 shown in FIG. 8a (e.g., touch input for the item 430).

Referring to FIGS. 8b and 8c, in response to a request for displaying detailed information of any one of the displayed items 431 and 432, the controller 180 may display information corresponding to the item on a use information window 440. The request for displaying the detailed information may be touch input for any one item, without being limited thereto.

The use information window 440 may be displayed in the form of a popup window. The controller 180 may display information corresponding to the item in the use information window 440. For example, if the information corresponding to the item is related to the used application, the controller 180 may display a variety of information such as a function or operation performed by the application, a transmitted/ received message, etc. in the use information window 440. If the information corresponding to the item is information related to the accessed files, the controller 180 may display information on a list of accessed files and information on leaking of the files in the use information window 440.

Referring to FIG. 8c, if an icon 424 displayed in the item 432 is an icon related to the accessed files, the controller 180 may display the list of accessed files in the use information window 440 in response to the request for displaying the detailed information of the item 432. Thus, the user of the watch-type mobile terminal 100 and the display device 300_1 can easily check whether the display device 300_1 is used by another person and check the use log of the display device 300_1 when the display device 300_1 is used.

Figure 9:
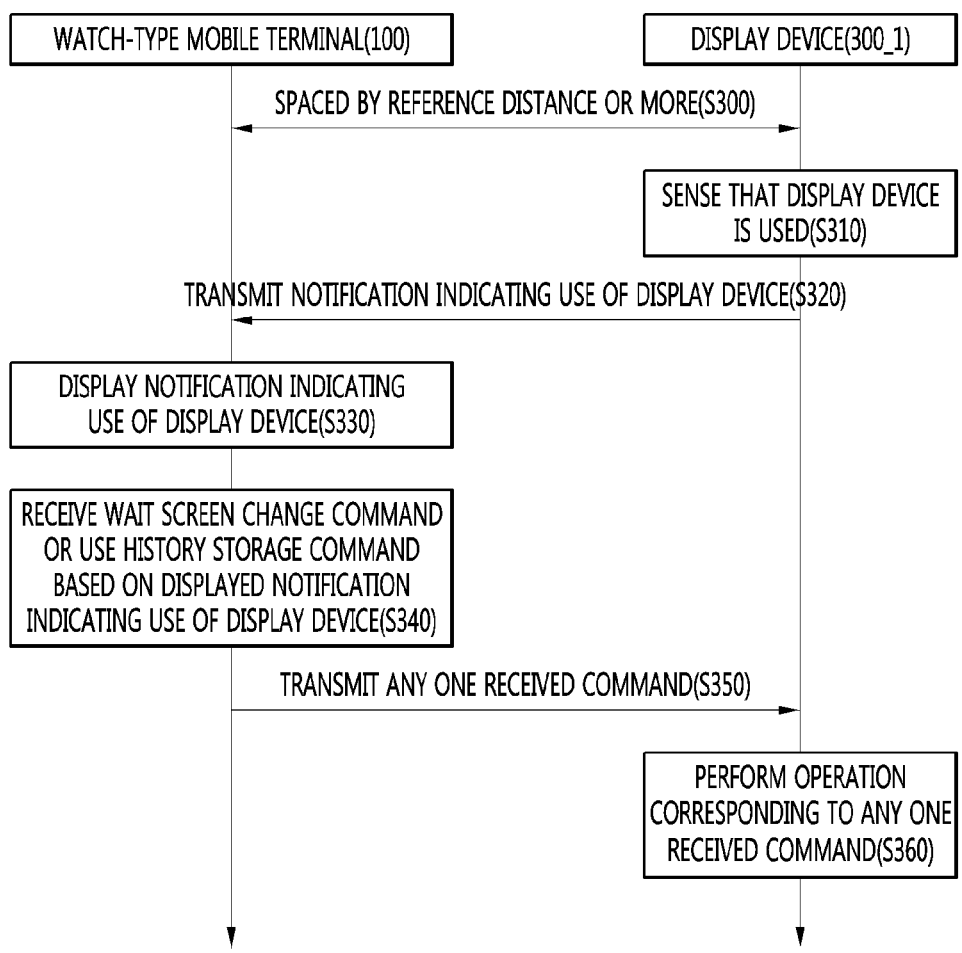
FIG. 9 is a ladder diagram illustrating an operation method according to another embodiment of the system shown in FIG. 4.

FIG. 9 is a ladder diagram illustrating an operation method according to another embodiment of the system shown in FIG. 4.

Referring to FIG. 9, when the watch-type mobile terminal 100 and the display device 300_1 are spaced apart from each other by a reference distance or more (S300), the controller of the display device 300_1 may sense that the display device 300_1 is used (S310).

Unlike the embodiment of FIG. 7, in FIG. 9, the watch-type mobile terminal 100 and the display device 300_1 are only spaced apart from each other by the reference distance or more but the connection between the watch-type mobile terminal 100 and the display device 300_1 may not be released. The reference distance may mean a distance where the user of the watch-type mobile terminal 100 cannot use the display device 300_1.

The controller of the display device 300_1 may measure the intensity of the signal transmitted from the watch-type mobile terminal 100 to acquire distance information between the watch-type mobile terminal 100 and the display device 300_1.

The controller of the display device 300_1 may recognize that the display device 300_1 is used by another person and transmit a notification indicating use of the display device to the watch-type mobile terminal 100 (S320), when the distance between the watch-type mobile terminal 100 and the display device 300_1 is greater than the reference distance.

The controller 180 of the watch-type mobile terminal 100 may display the received notification indicating use of the display device or a message corresponding thereto on the display unit 151 (S330). In some embodiments, the controller 180 may output sound corresponding to the received notification indicating the use of the display device through the audio output module 152 or output vibrations through the haptic module 153.

The controller 180 may receive a wait screen change command or a use history storage command based on the displayed (or output) notification indicating use of the display device (S340) and transmit any one command to the display device 300_1 (S350).

In some embodiments, the controller 180 may display a popup window for receiving any one of the wait screen change command or the use history storage command. When any one command is received based on the displayed popup window, the controller 180 may transmit the command to the display device 300_1.

The display device 300_1 may forcibly change the screen of the display device 300_1 to the wait screen or store the use history (at least one of a period of use, an application execution log and a file access log) of the display device 300_1 (S360).

Operation of the watch-type mobile terminal 100 according to the embodiment shown in FIG. 9 will be described in greater detail with reference to FIGS. 10a and 10b.

Figure 10A:
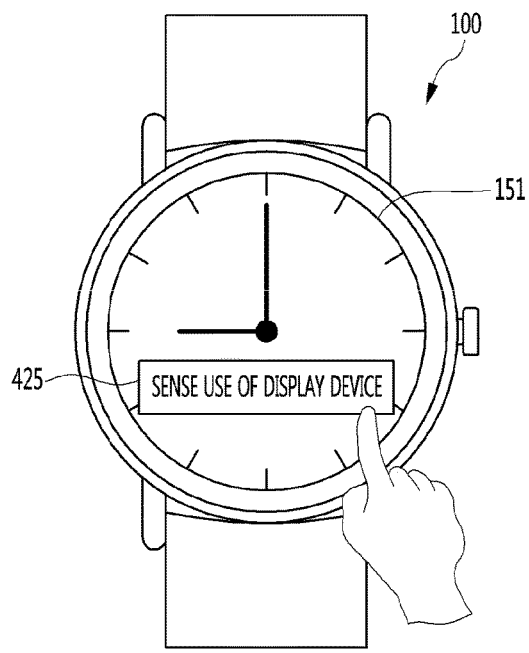
FIGS. 10a and 10b are diagrams showing operation of the watch-type mobile terminal shown in FIG. 9.
Figure 10B:
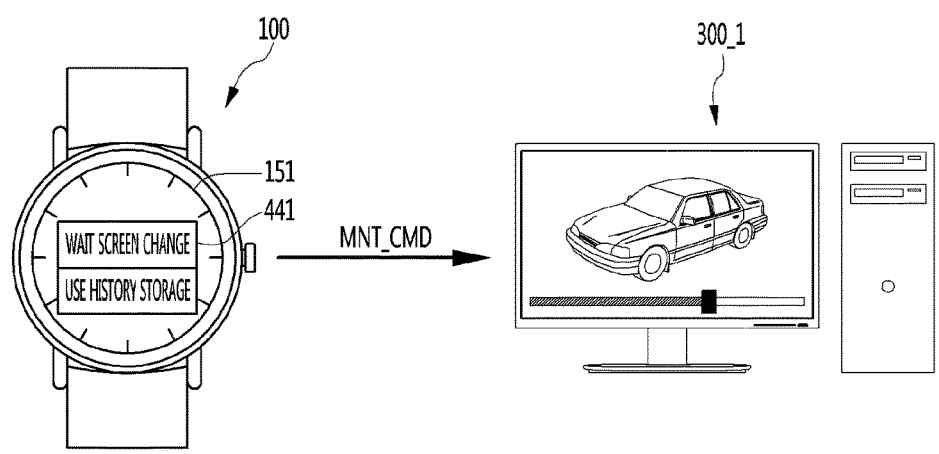

FIGS. 10a and 10b are diagrams showing operation of the watch-type mobile terminal shown in FIG. 9.

Referring to FIG. 10a, when the watch-type mobile terminal 100 and the display device 300_1 are spaced apart from each other by the reference distance or more and the display device 300_1 is used, the watch-type mobile terminal 100 may receive the notification indicating use of the display device from the display device 300_1.

The controller 180 may display a notification message 425 corresponding to the notification indicating use of the display device on the display unit 151. The notification message 425 may be displayed at a specific position of the clock screen as shown in FIG. 10*a*, without being limited thereto.

Referring to FIGS. 10*a* and 10*b*, the controller 180 may receive a request for selection of the notification message 425 displayed on the display unit 151 (e.g., touch input of the notification message 425) and display a command selection window 441 on the display unit 151 based on the received request for selection.

The command selection window 441 may include at least one of a wait screen change icon and a use history storage icon. In response to a request for selecting any one of the wait screen change icon and the use history storage icon, the controller 180 may transmit a command MNT_CMD corresponding to any one selected icon to the display device 300_1.

For example, when a request for selecting the wait screen change icon is received, the controller 180 may transmit, to the display device 300_1, a wait screen change command for controlling change of the screen of the display device 300_1 to the wait screen.

In contrast, when a request for selecting the use history storage icon is received, the controller 180 may transmit a use history storage command for controlling storage of the use history of the display device 300_1 to the display device 300_1.

If it is determined that the display device 300_1 is used by another person when the user of the watch-type mobile terminal 100 and the display device 300_1 is separated from the display device 300_1 by a predetermined distance or more, operation of the display device 300_1 may be remotely controlled using the watch-type mobile terminal 100.

Figure 11:
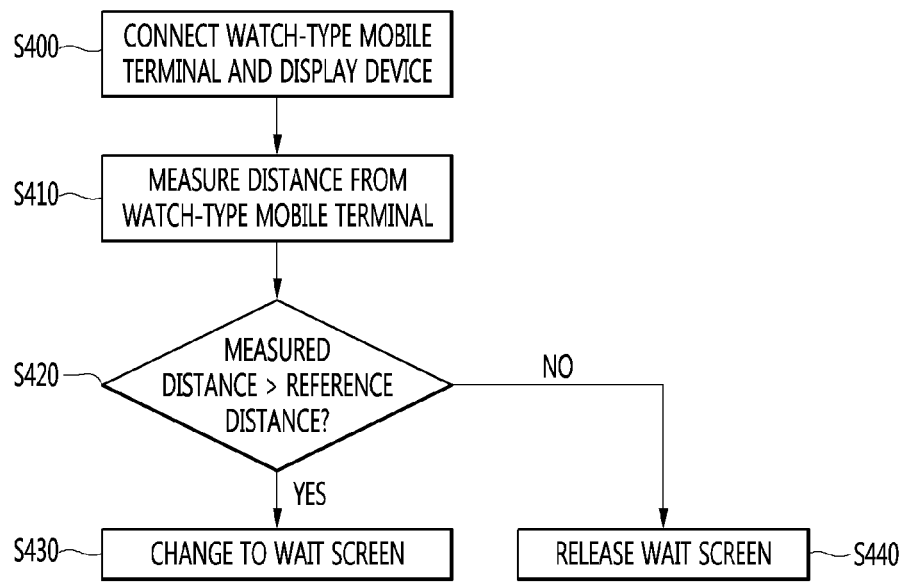
FIG. 11 is a flowchart illustrating an operation method according to another embodiment of the system shown in FIG. 4.

FIG. 11 is a flowchart illustrating an operation method according to another embodiment of the system shown in FIG. 4.

Referring to FIG. 11, when the watch-type mobile terminal 100 and the display device 300_1 are connected (S400), the display device 300_1 may measure the distance from the watch-type mobile terminal 100 (S410). The method of measuring the distance from watch-type mobile terminal 100 at the display device 300_1 may include a method of using the intensity of a specific signal transmitted from the watch-type mobile terminal 100 to the display device 300_1, as described above.

When the measured distance is greater than a reference distance (YES of S420), the controller of the display device 300_1 may change the screen to the wait screen (S430) if the screen of the display device 300_1 has not been changed to the wait screen. In contrast, when the measured distance is less than a reference distance (NO of S420), the controller of the display device 300_1 may release the wait screen if the screen of the display device 300_1 has been changed to the wait screen.

Figure 12A:
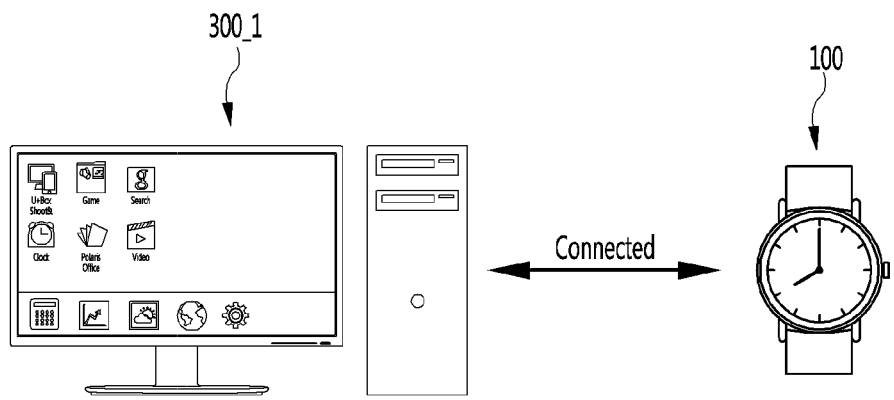
FIGS. 12a to 12c are diagrams illustrating the embodiment shown in FIG. 11.
Figure 12B:
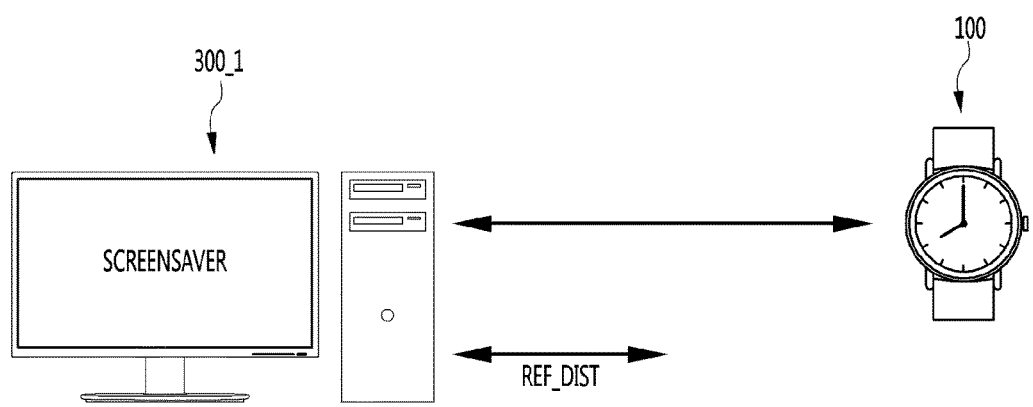
Figure 12C:
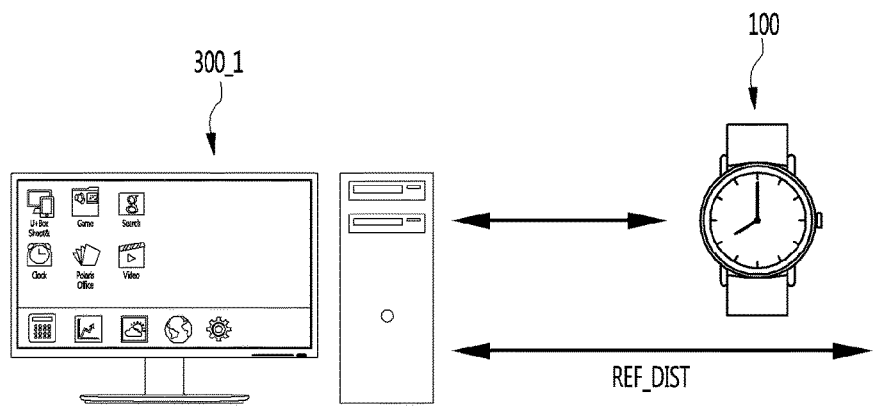

FIGS. 12*a* to 12*c* are diagrams illustrating the embodiment shown in FIG. 11.

Referring to FIGS. 12*a* to 12*c*, the controller of the display device 300_1 may measure the intensity of the signal received from the watch-type mobile terminal 100 connected to the display device 300_1 to measure the distance between the display device 300_1 and the watch-type mobile terminal 100.

When the measured distance is greater than the reference signal REF_DIST, the controller of the display device 300_1 may automatically change the screen of the display device 300_1 to the wait screen (e.g., the screensaver) or maintain the wait screen. The measured distance being greater than the reference distance REF_DIST may mean that the user is located at a distance where the user cannot use the display device 300_1.

In contrast, when the measured distance is less than the reference signal REF_DIST, the controller of the display device 300_1 may release the wait screen of the display device 300_1. The measured distance being less than the reference distance REF_DIST may mean that the user is located at a distance where the user can use the display device 300_1.

That is, the display device 300_1 may automatically perform operation for changing the screen of the display device 300_1 to the wait screen or releasing the wait screen based on the distance of the watch-type mobile terminal 100, without receiving a request through the input unit 120 such as the user input unit 123.

Figure 13:
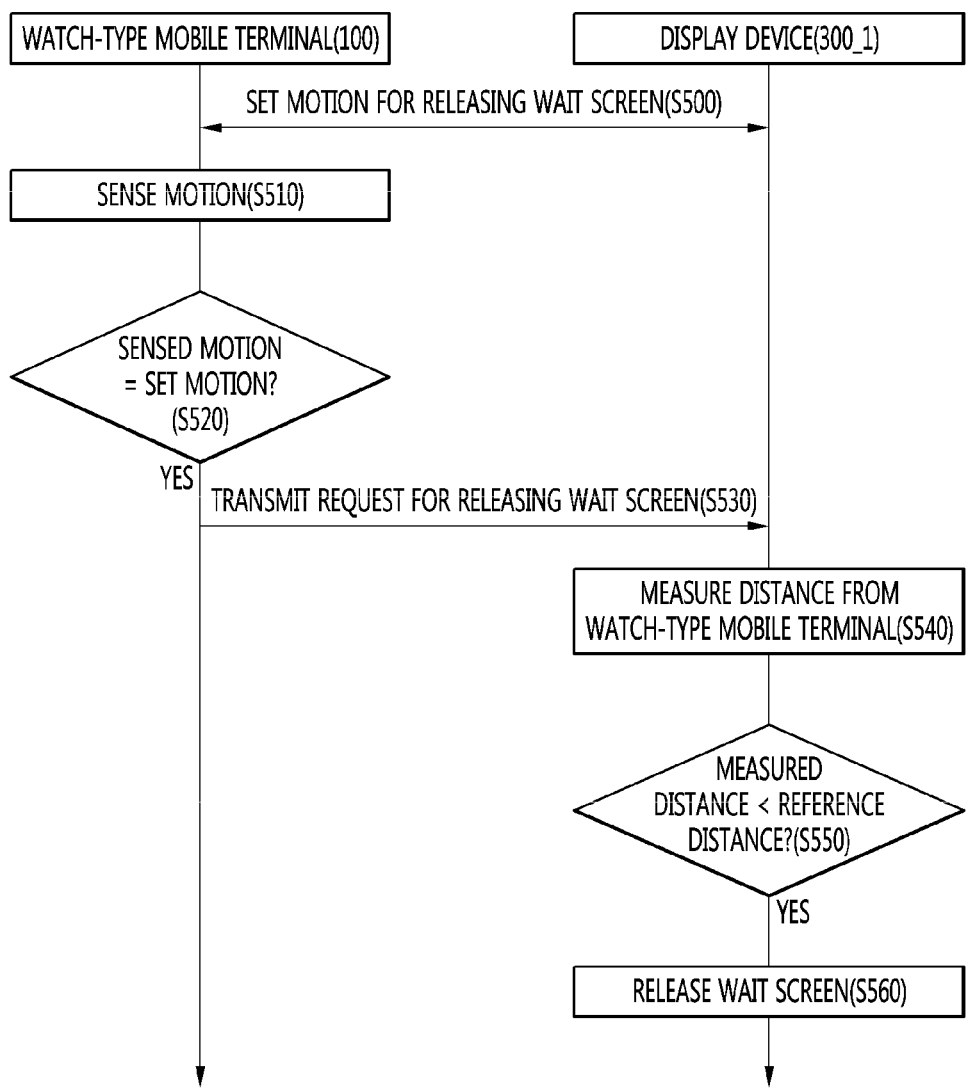
FIG. 13 is a ladder diagram illustrating an operation method according to another embodiment of the system shown in FIG. 4.

FIG. 13 is a ladder diagram illustrating an operation method according to another embodiment of the system shown in FIG. 4.

Referring to FIG. 13, the controller 180 of the watch-type mobile terminal 100 may set a motion for releasing the wait screen of the display device 300_1 connected to the watch-type mobile terminal 100 (S500). For example, the controller 180 may receive a request for setting the motion, receive the motion through the motion sensor included in the watch-type mobile terminal 100, and set the input motion as a wait screen release motion. In some embodiments, the set wait screen release motion may be transmitted to the display device 300_1.

After the wait screen release motion is set, the controller 180 of the watch-type mobile terminal 100 may sense the motion of the watch-type mobile terminal 100 using the motion sensor (S510). For example, when the user of the watch-type mobile terminal 100 moves a wrist (or arm), on which the watch-type mobile terminal 100 is worn, in order to release the wait screen of the display device 300_1, the controller 180 may sense the motion using the motion sensor.

The controller 180 may compare the sensed motion with a predetermined wait screen release motion and transmit a wait screen release request to the display device 300_1 (S530) if the sensed motion is equal to the predetermined wait screen release motion (YES of S520).

The controller of the display device 300_1 may automatically release the wait screen in response to the received wait screen release request.

In some embodiments, if the wait screen is set to be released only when the distance between the watch-type mobile terminal 100 and the display device 300_1 is equal to or less than the reference distance, the controller of the display device 300_1 may measure the distance from the watch-type mobile terminal 100 in response to the received wait screen release request (S540) and release the wait screen (S560) when the measured distance is less than the reference distance (YES of S550). Accordingly, since the wait screen of the display device 300_1 may be released only when the user is located within a predetermined distance of the display device 300_1, it is possible to prevent the wait screen of the display device 300_1 from being released by an unintended motion of the user at the position where the display device 300_1 cannot be used.

Figure 14A:
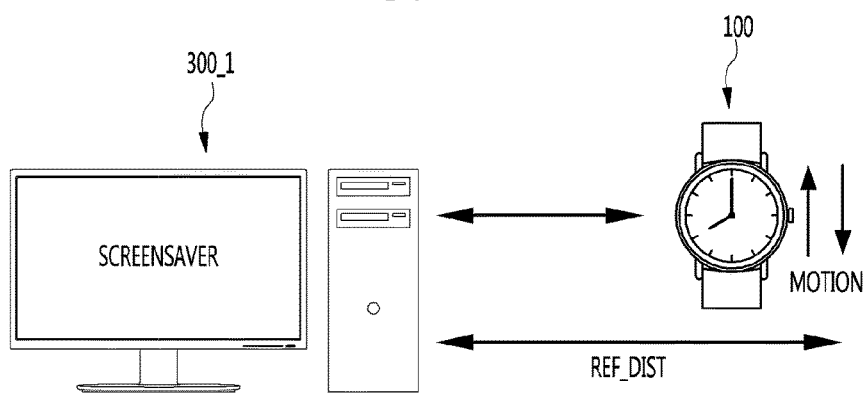
FIGS. 14a and 14b are diagrams illustrating the embodiment shown in FIG. 13.
Figure 14B:
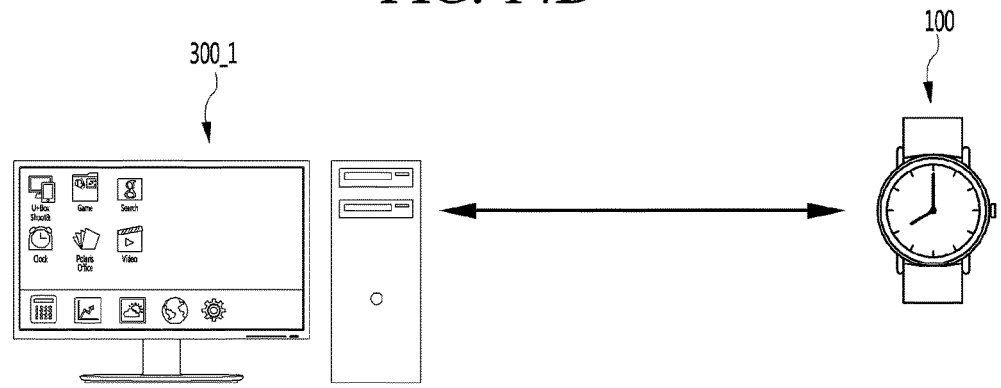

FIGS. 14*a* and 14*b* are diagrams illustrating the embodiment shown in FIG. 13.

Referring to FIGS. 14*a* and 14*b*, the controller 180 of the watch-type mobile terminal 100 may sense motion of the watch-type mobile terminal 100 using the motion sensor. For example, when a set wait screen release motion is a "top-bottom" motion and the sensed motion is equal to the wait screen release motion, the controller 180 may transmit a wait screen release request to the display device 300_1.

The display device 300_1 may release the wait screen in response to the received wait screen release request. At this time, the controller of the display device 300_1 may measure a distance between the watch-type mobile terminal 100 and the display device 300_1 and release the wait screen only when the measured distance is equal to or less than the reference distance REF_DIST.

Operations of the watch-type mobile terminal 100 and the display device 300_1 according to the embodiments described with reference to FIGS. 3 to 14b may be activated or deactivated according to settings.

Figure 15:
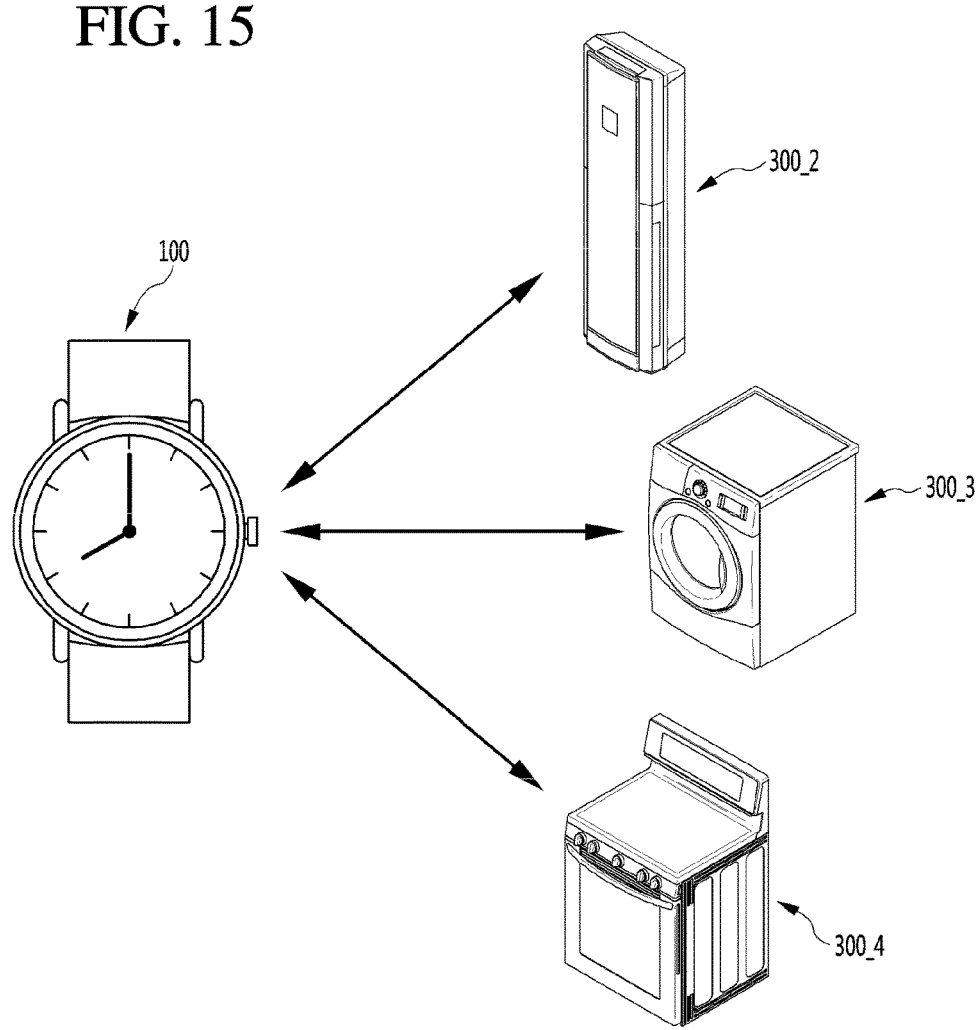
FIG. 15 is a diagram showing various embodiments of the external device shown in FIG. 3.

FIG. 15 is a diagram showing various embodiments of the external device shown in FIG. 3.

The external device 300 connected to the watch-type mobile terminal 100 is not limited to the display device 300_1. For example, the watch-type mobile terminal 100 may be connected to at least one of an air conditioner 300_2, a washing machine 300_3 and an oven 300_4 to control an event occurring in the external device. Although only the air conditioner 300_2, the washing machine 300_3 and the oven 300_4 are shown as the example of the external device 300 in FIG. 15 for convenience of description, the external device 300 connected to the watch-type mobile terminal 100 is not limited thereto.

Each of the air conditioner 300_2, the washing machine 300_3 and the oven 300_4 may have a wireless communication unit connected to the watch-type mobile terminal 100 to exchange signals, information and/or data and a controller for controlling each operation and acquiring information related to an event occurrence time.

Hereinafter, embodiments in which the watch-type mobile terminal 100 is connected to each of the air conditioner 300_2, the washing machine 300_3 and the oven 300_4 will be described.

FIGS. 16 to 17b are diagrams showing a case in which the external device of FIG. 3 is an air conditioner.

Referring to FIG. 16, the controller 180 of the watch-type mobile terminal 100 connected to the air conditioner 300_2 may receive first information AC_INFO1 related to a set temperature entrance time from the air conditioner 300_2.

The controller of the air conditioner 300_2 may acquire the first information AC_INFO1 related to the set temperature entrance time. For example, the controller may acquire the first information AC_INFO1 by calculating and predicting the set temperature entrance time based on change in temperature of a place where the air conditioner 300_2 is mounted and a set temperature. The controller of the air conditioner 300_2 may transmit the acquired first information AC_INFO1 to the watch-type mobile terminal 100.

In some embodiments, the air conditioner 300_2 may periodically acquire the first information AC_INFO1 and periodically transmit the acquired first information AC_INFO1 to the watch-type mobile terminal 100.

In another embodiment, the air conditioner 300_2 may transmit the first information AC_INFO1 to the watch-type mobile terminal 100 when a current time reaches a time earlier than the set temperature entrance time by a predetermined reference time. For example, if the set temperature entrance time is "8:15" and the predetermined reference time is "10 min", the air conditioner 300_2 may transmit the first information AC_INFO1 to the watch-type mobile terminal 100 when the current time reaches "8:05".

The controller 180 of the watch-type mobile terminal 100 may display an item 410 corresponding to the set temperature entrance time on the clock screen based on the received first information AC_INFO1. The item 410 may be displayed at the position of the clock screen corresponding to the set temperature entrance time to intuitively indicate the set temperature entrance time.

In some embodiments, the controller 180 may or may not display the item 410 based on a difference between the time when the first information AC_INFO1 is received from the air conditioner 300_2 and the set temperature entrance time. For example, if the time when the first information AC_INFO1 is received from the air conditioner 300_2 (e.g., "8:00") is not within the reference time (e.g., "10 min") from the set temperature entrance time (e.g., "8:15"), the controller 180 may not display the item 410 on the clock screen. In contrast, as shown in FIG. 16, if the time when the first information AC_INFO1 is received (e.g., "8:05") is within the reference time (e.g., "10 min") from the set temperature entrance time (e.g., "8:15"), the controller 180 may display the item 410 on the clock screen.

The controller 180 may further display a notification message 460 indicating the set temperature entrance time on the clock screen based on the current time and the set temperature entrance time.

Figure 17A:
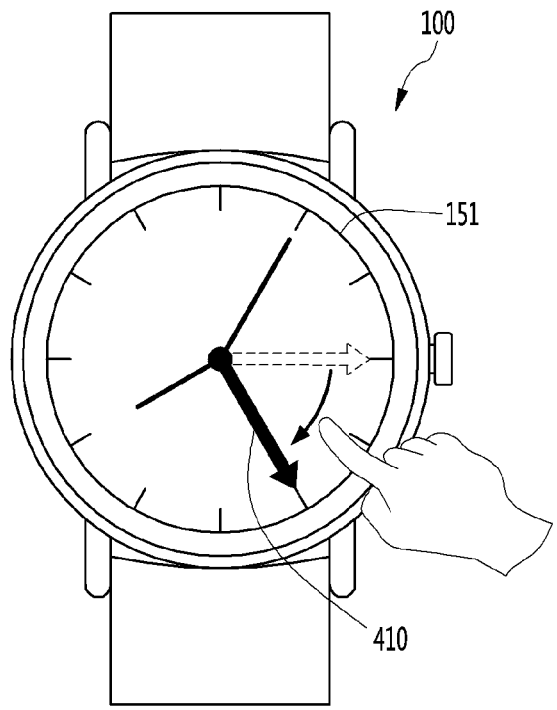
Figure 17B:
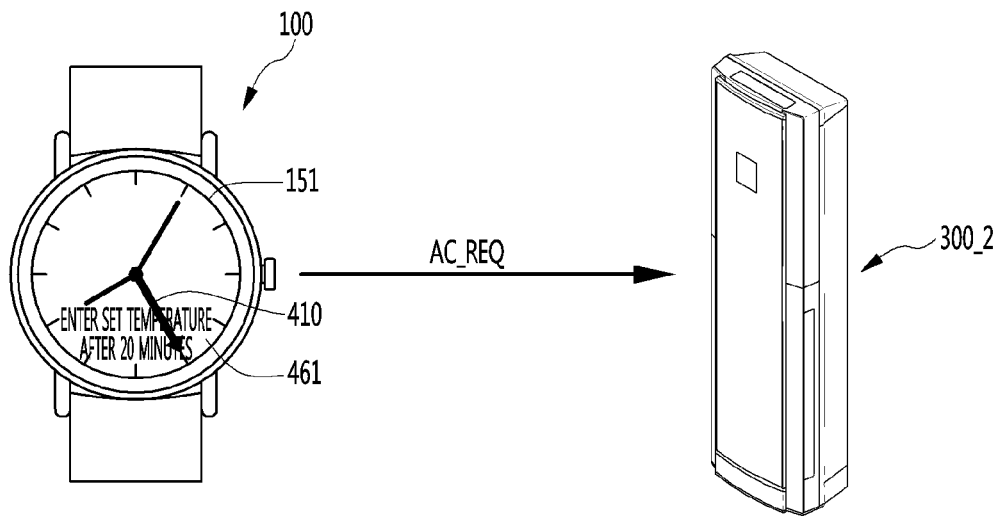

Referring to FIGS. 17a to 17b, the controller 180 may display the item 410 in correspondence with the adjusted set temperature entrance signal included in the request in response to a request for adjusting the event occurrence time (set temperature entrance time) received from the watch-type mobile terminal 100 based on the item 410 displayed on the clock screen of the display unit 151. For example, the controller 180 may move and display the item 410 to and at the position corresponding to the adjusted set temperature entrance signal. In some embodiments, the controller 180 may display an updated notification message 461 based on the request for adjusting the set temperature entrance time.

Referring to FIG. 17b, the controller 180 may transmit the received request for adjusting the set temperature entrance signal AC_REQ to the air conditioner 300_2. Similarly to the description of FIG. 3, the controller 180 may variously change the order of operation for moving and displaying the item 410 and operation for transmitting the request for adjusting the set temperature entrance time AC_REQ to the air conditioner 300_2.

The controller of the air conditioner 300_2 may control operation of the air conditioner 300_2 in response to the received request for adjusting the set temperature entrance time AC-REQ. If the request for adjusting the set temperature entrance time AC-REQ is a request for delaying the set temperature entrance signal from "8:15" to "8:25", the controller of the air conditioner 300_2 may control operation (fan speed, etc.) of the air conditioner 300_2 such that the temperature of a place where the air conditioner 300_2 is mounted reaches a set temperature at "8:25".

Figure 18:
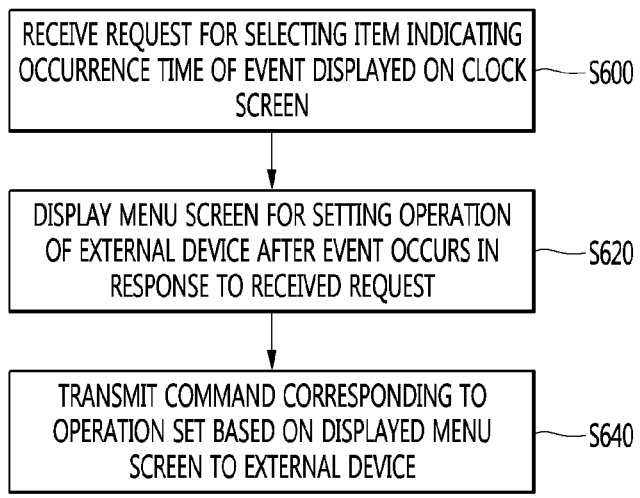
FIG. 18 is a flowchart illustrating a method of operating a watch-type mobile terminal according to another embodiment of the present disclosure.

FIG. 18 is a flowchart illustrating a method of operating a watch-type mobile terminal according to another embodiment of the present disclosure.

Referring to FIG. 18, as shown in FIG. 16, when the item 410 is displayed on the clock screen of the display unit 151 of the watch-type mobile terminal 100, the controller 180 of the watch-type mobile terminal 100 may receive a request for selecting the item 410 (S600). For example, the request for selecting the item 410 may be touch input of the displayed item 410, without being limited thereto, and may be implemented by input through various input devices such as the user input unit 123.

The controller 180 may display a menu screen for setting operation of the external device 300 after an event corresponding to the item 410 occurs on the display unit 151 in response to the received request (S620). The controller 180 may display different menu screens based on the connected external device 300. The menu screen may include at least one operation setting item for setting operation of the external device 300. To this end, the controller 180 may further receive information on settable operation from the external device 300.

The controller 180 may transmit a command corresponding to operation set based on the displayed menu screen to the external device 300 (S640). The external device 300 may perform operation corresponding to the received command. That is, the user of the watch-type mobile terminal 100 may remotely control operation of the external device 300 through the watch-type mobile terminal 100.

The embodiment shown in FIG. 18 will be described in greater detail with reference to FIGS. 19a to 19d, FIGS. 22a to 22d and FIGS. 25a to 25d.

FIGS. 19a to 19d are diagrams showing operation for controlling an event for an air conditioner using the watch-type mobile terminal according to the embodiment shown in FIG. 18.

Figure 19A:
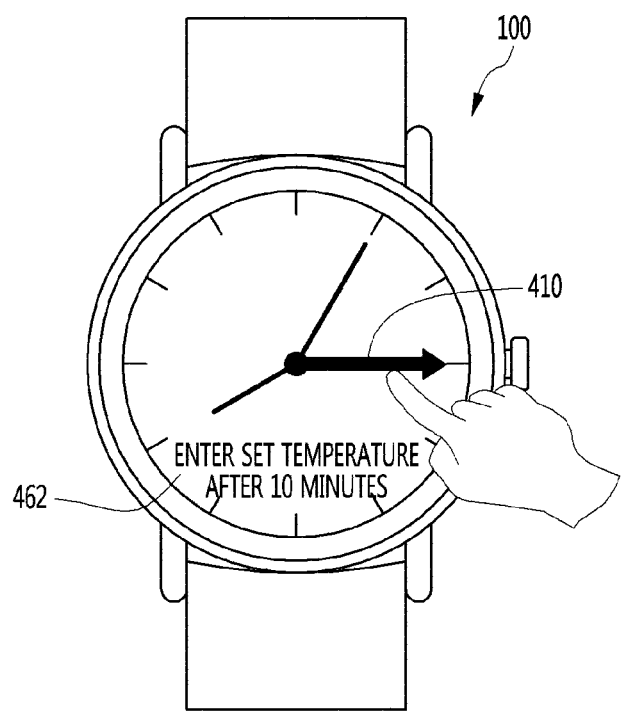
FIGS. 19a to 19d are diagrams showing operation for controlling an event for an air conditioner using the watch-type mobile terminal according to the embodiment shown in FIG. 18.
Figure 19B:
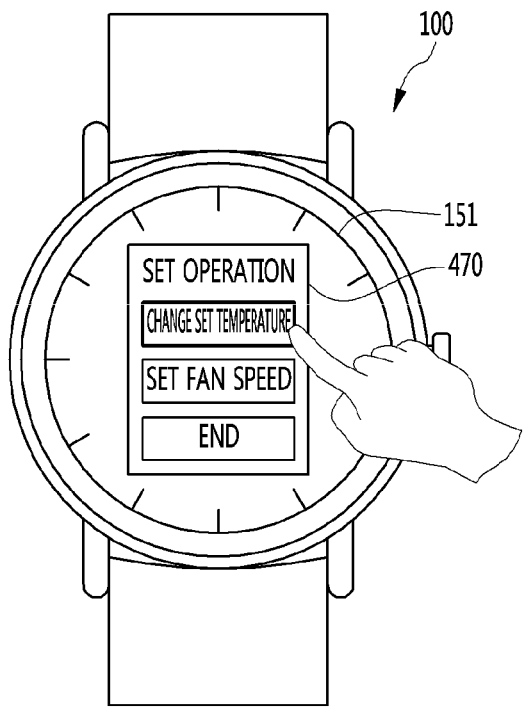

Referring to FIGS. 19a and 19b, the controller 180 may receive a request for selecting the item 410 displayed on the clock screen of the display unit 151. Although touch input for the displayed item 410 is shown as an embodiment of the request in FIG. 19a, the type of the request is not limited thereto.

The controller 180 may display an operation setting window 470 as a menu screen for setting operation of the air conditioner 300_2 connected to the watch-type mobile terminal 100 in response to the request for selecting the item 410. The operation setting window 470 may include an operation setting icon corresponding to at least one operation setting item.

Although "set temperature change", "fan speed change" and "end" icons are shown as examples of the operation setting icons included in the operation setting window 470 in FIG. 19b, the type of the operation setting icon is not limited thereto.

The "set temperature change" icon may correspond to operation for changing the set temperature of the air conditioner 300_2, the fan speed change" icon may correspond to operation for changing the fan speed of the air conditioner 300_2 and the "end" icon may correspond to end of operation of the air conditioner 300_2.

The controller 180 may transmit a command for setting operation of the air conditioner 300_2 after an event (e.g., set temperature entrance) corresponding to the item 410 occurs to the air conditioner 300_2 based on a request for selecting any one of the operation setting icons included in the operation setting window 470.

Figure 19C:
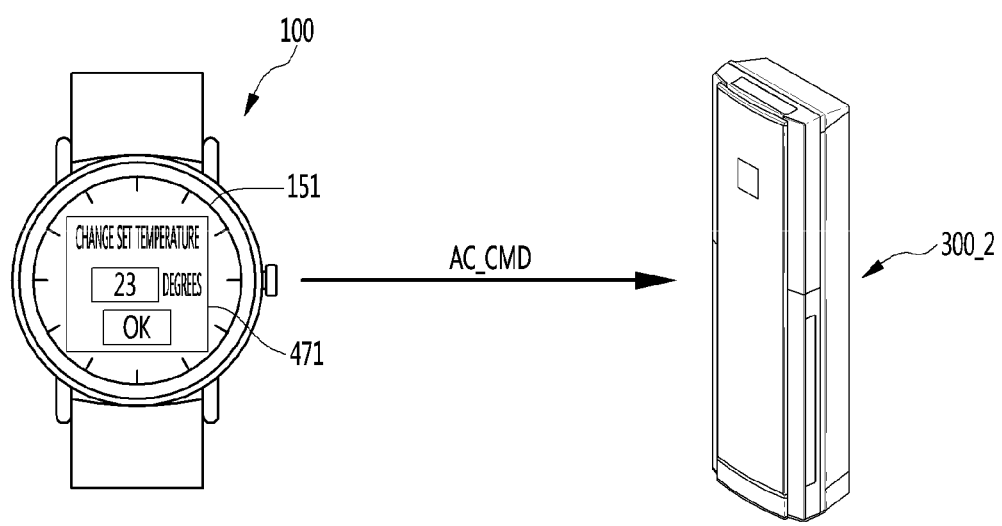
Figure 19D:
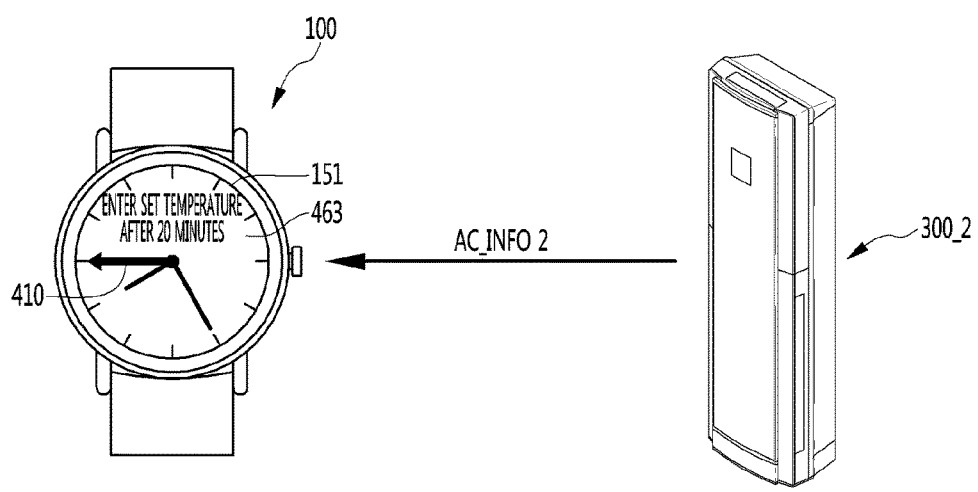

Referring to FIGS. 19b to 19d, when the "set temperature change" icon is selected from among the operation setting icons, the controller 180 may display a set temperature change window 471 for setting a temperature to be changed. When the temperature to be changed is set through the set temperature change window 471, the controller 180 may transmit a set temperature change command AC_CMD to the air conditioner 300_2.

Although not shown, when the "fan speed change" icon is selected from among the operation setting icons, the controller 180 may display a fan speed change window similarly to the set temperature change window 471 shown in FIG. 19c. When the fan speed to be changed is set through the displayed fan speed change window, the controller 180 may transmit the fan speed change command to the air conditioner 300_2.

In addition, when the "end" icon is selected, the controller 180 may transmit a command for controlling end of operation of the air conditioner 300_2 after an event corresponding to the item 410 occurs to the air conditioner 300_2.

Referring to FIG. 19d, the controller of the air conditioner 300_2 may control operation of the air conditioner 300_2 after the event corresponding to the item 410 occurs, in response to the received set temperature change command AC_CMD. For example, as shown in FIG. 19c, when the temperature to be changed is "23°", the controller of the air conditioner 300_2 may control operation (cooling operation) of the air conditioner 300_2 based on the temperature to be changed.

The controller of the air conditioner 300_2 may acquire second information AC_INFO2 related to the set temperature entrance time based on the set temperature (e.g., "23°") corresponding to the set temperature change command AC_CMD and the temperature (or temperature change) of the place where the air conditioner 300_2 is mounted and transmit the acquired second information AC_INFO2 to the watch-type mobile terminal 100.

The controller 180 of the watch-type mobile terminal 100 may display the item 410 on the clock screen based on the received second information AC_INFO2. For example, if a time when the temperature of the place where the air conditioner 300_2 is mounted is changed to a set temperature ("23°") is "8:45", the controller 180 may display the item 410 at the position of the clock screen corresponding to "8:45".

FIGS. 20 to 21b are diagrams showing a case in which the external device of FIG. 3 is a washing machine.

Referring to FIG. 20, the controller 180 of the watch-type mobile terminal 100 connected to the washing machine 300_3 may receive first information WM_INFO1 related to a washing end time from the washing machine 300_3.

The controller of the washing machine 300_3 may acquire the first information WM_INFO1 related to the washing end time. For example, the controller may acquire the first information WM_INFO1 by calculating the washing end time based on the end time of at least one operation currently set in the washing machine 300_3. The controller of the washing machine 300_3 may transmit the acquired first information WM_INFO1 to the watch-type mobile terminal 100.

In some embodiments, the washing machine 300_3 may periodically acquire the first information WM_INFO1 and periodically transmit the acquired first information WM_INFO1 to the watch-type mobile terminal 100.

In another embodiment, the washing machine 300_3 may transmit the first information WM_INFO1 to the watch-type mobile terminal 100 when the current time reaches a time earlier than a washing end time by a predetermined reference time. For example, when the washing end time is "10:10" and the predetermined reference time is "10 min", the washing machine 300_3 may transmit the first information WM_INFO1 to the watch-type mobile terminal 100 when the current time reaches "10:00".

The controller 180 of the watch-type mobile terminal 100 may display the item 410 corresponding to the washing end time on the clock screen based on the received first information WM_INFO1. The item 410 may be displayed at the position of the clock screen corresponding to the washing end time, thereby intuitively indicating the washing end time.

In some embodiments, the controller 180 may or may not display the item 410 based on a difference between a time when the first information WM_INFO1 is received from the washing machine 300_3 and the washing end time. For example, if the time when the first information WM_INFO1 is received from the washing machine 300_3 (e.g., "9:50") is not within the reference time (e.g., "10 min") of the washing end time (e.g., "10:10"), the controller 180 may not display the item 410 on the clock screen. In contrast, as shown in FIG. 20, if the time when the first information WM_INFO1 is received from the washing machine 300_3 (e.g., "10:00") is within the reference time (e.g., "10 min") of the washing end time (e.g., "10:10"), the controller 180 may display the item 410 on the clock screen.

The controller 180 may further display a notification message 464 indicating the washing end time on the clock screen based on the current time and the washing end time.

Figure 21A:
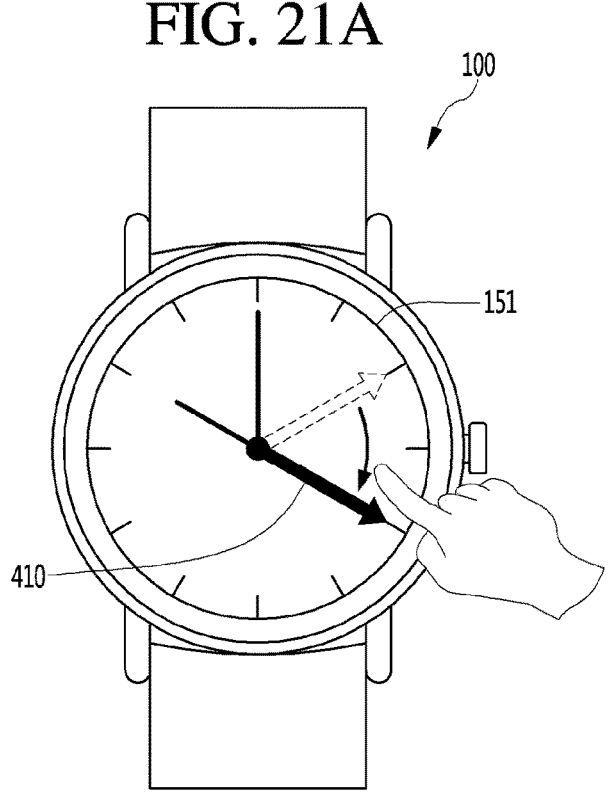
Figure 21B:
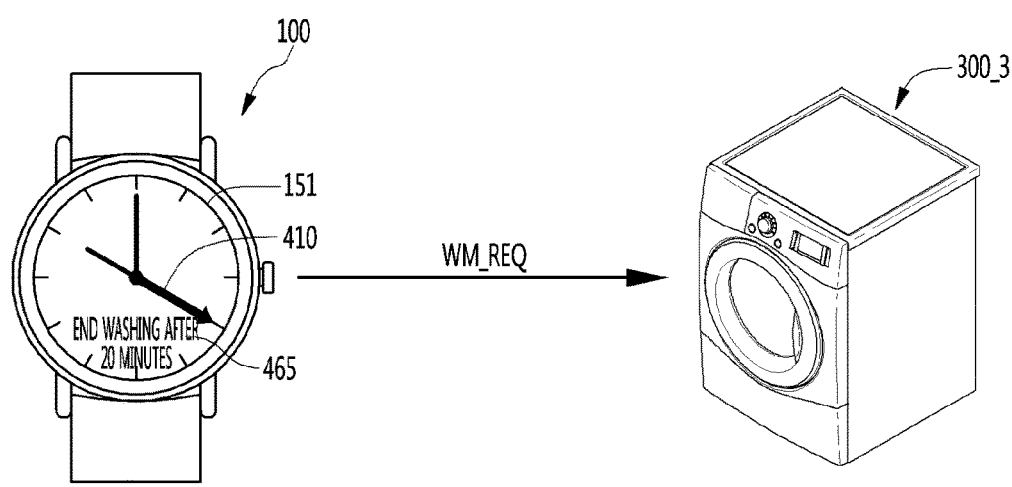

Referring to FIGS. 21*a* and 21*b*, in response to a request for adjusting an event occurrence time (washing end time) received from the watch-type mobile terminal 100 based on the item 410 displayed on the clock screen of the display unit 151, the controller 180 may display the item 410 in correspondence with the adjusted washing end time included in the request. For example, the controller 180 may move and display the item 410 to and at the position corresponding to the adjusted washing end time. In some embodiments, the controller 180 may display an updated notification message 465 based on the request for adjusting the washing end time.

Referring to FIG. 21*b*, the controller 180 may transmit the received request for adjusting the washing end time WM_REQ to the washing machine 300_3. Similarly to the description of FIG. 3, the controller 180 may variously change the order of operation for moving and displaying the item 410 and operation for transmitting the request for adjusting the washing end time WM_REQ to the washing machine 300_3.

The controller of the washing machine 300_3 may control operation of the washing machine 300_3 in response to the received request for adjusting the washing end time WM_REQ. If the request for adjusting the washing end time WM_REQ is a request for delaying the washing end time from "10:10" to "10:20", the controller of the washing machine 300_3 may adjust the time of at least one of an operation (e.g., "rinsing" operation) which is currently being performed and an operation to be performed (e.g., "dehydration" operation) to change the washing end time of the washing machine 300_3.

FIGS. 22*a* to 22*d* are diagrams showing operation for controlling an event for a washing machine using the watch-type mobile terminal according to the embodiment shown in FIG. 18.

Figure 22A:
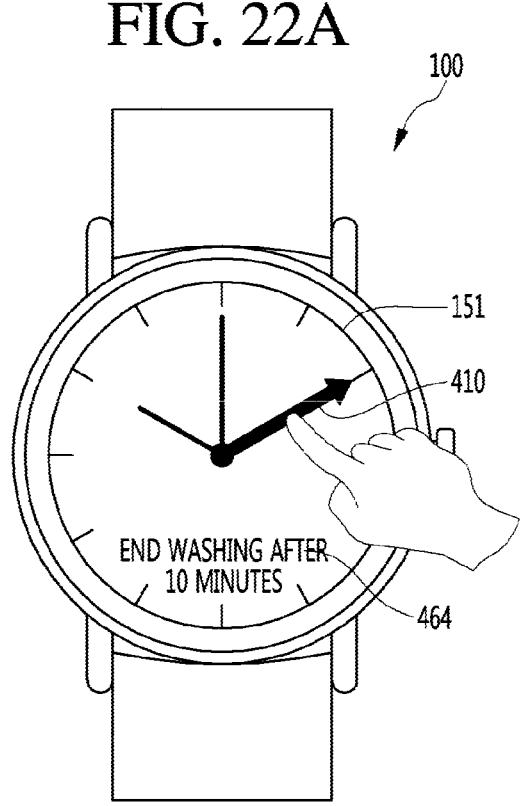
FIGS. 22a to 22d are diagrams showing operation for controlling an event for a washing machine using the watch-type mobile terminal according to the embodiment shown in FIG. 18.
Figure 22B:
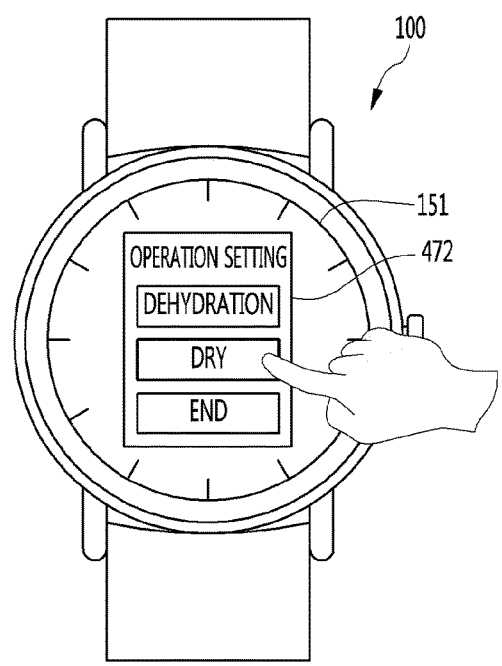

Referring to FIGS. 22*a* and 22*b*, the controller 180 may receive a request for selecting the item 410 displayed on the clock screen of the display unit 151. Although touch input for the displayed item 410 is shown as an embodiment of the request in FIG. 22*a*, the type of the request is not limited thereto.

The controller 180 may display an operation setting window 472 as a menu screen for setting operation of the washing machine 300_3 connected to the watch-type mobile terminal 100 in response to a request for selecting the item 410. The operation setting window 472 may include an operation setting icon corresponding to at least one operation setting item.

Although, in FIG. 22*b*, "dehydration", "dry" and "end" icons are shown as examples of the operation setting icons included in the operation setting window 472, the type of the operation setting icon is not limited thereto.

The "dehydration" icon may correspond to operation for performing control to perform dehydration operation, the "dry" icon may correspond to operation for performing control to perform drying operation, and the "end" icon may correspond to end of operation of the washing machine 300_3.

The controller 180 may transmit a command for setting operation of the washing machine 300_3 after an event (e.g., washing end) corresponding to the item 410 occurs to the washing machine 300_3, based on a request for selecting any one of the operation setting icons included in the operation setting window 472.

Figure 22C:
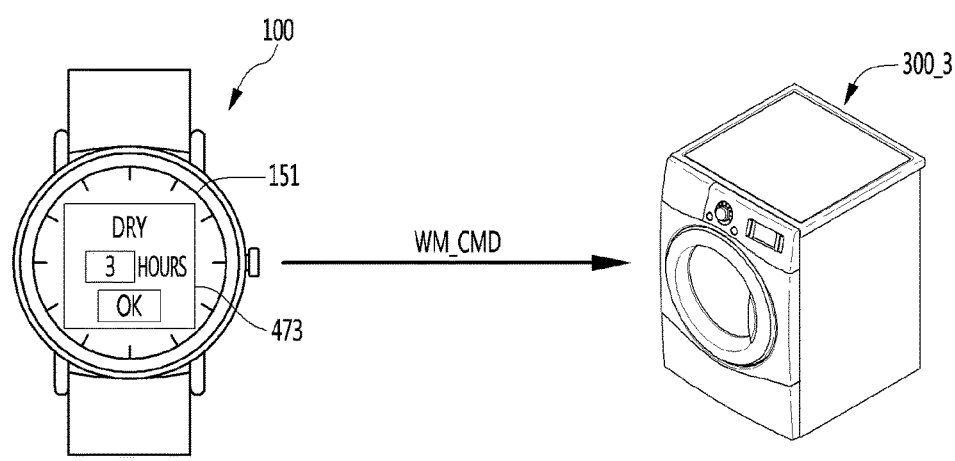
Figure 22D:
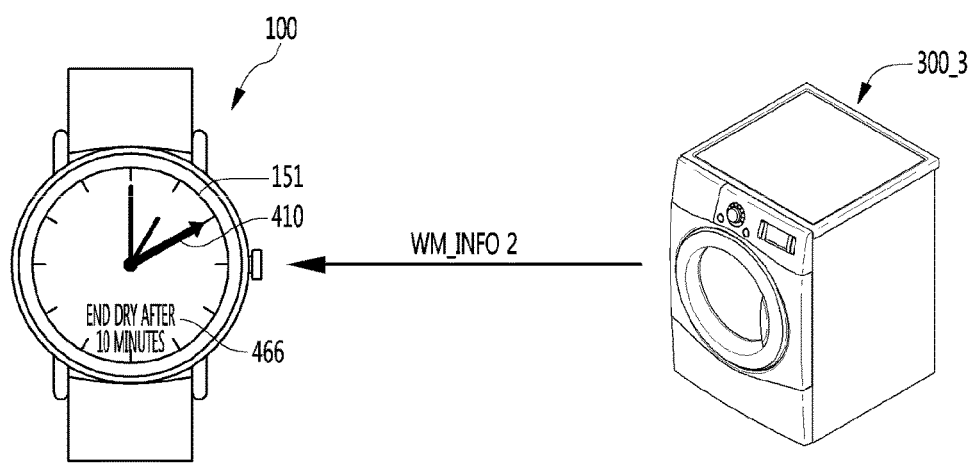

Referring to FIGS. 22*b* to 22*d*, when the "dry" icon is selected from among the operation setting icons, the controller 180 may display a drying time setting window 473 for setting a drying operation time. When the drying time is set through the drying time setting window 473, the controller 180 may transmit a drying operation command WM_CMD including information on the drying time to the washing machine 300_3.

Although not shown, when the "dehydration" icon is selected from among the operation setting icons, the controller 180 may display a dehydration time setting window similar to the drying time setting window 473 shown in FIG. 22*c*. When the dehydration time is set through the displayed dehydration time setting window, the controller 180 may transmit a dehydration operation command including information on the dehydration time to the washing machine 300_3.

In addition, when the "end" icon is selected, the controller 180 may transmit a command for performing control to end operation of the washing machine 300_3 to the washing machine 300_3 after an event corresponding to the item 410 occurs.

Referring to FIG. 22*d*, the controller of the washing machine 300_3 may control operation of the washing machine 300_3 after an event corresponding to the item 410 occurs (e.g., after washing end) in response to the received drying operation command WM_CMD. For example, as shown in FIG. 22*c*, when the drying time is "3 hours", the controller of the washing machine 300_3 may control the washing machine 300_3 to perform the drying operation for three hours.

The controller of the washing machine 300_3 may acquire second information WM_INFO2 related to a drying end time and transmit the acquired second information WM_INFO2 to the watch-type mobile terminal 100, based on a drying time included in the drying operation command WM_CMD and the current time.

The controller 180 of the watch-type mobile terminal 100 may display the item 410 on the clock screen based on the received second information WM_INFO2. For example, when the drying end time of the washing machine 300_3 is "1:10", the controller 180 may display the item 410 at the position of the clock screen corresponding to "1:10". In some embodiments, the controller 180 may further display a notification message 466 indicating drying end based on the current time and the drying end time.

FIGS. 23 to 24*b* are diagrams showing a case in which the external device of FIG. 3 is an oven.

Referring to FIG. 23, the controller 180 of the watch-type mobile terminal 100 connected to the oven 300_4 may receive first information OV_INFO1 related to a cooking end time from the oven 300_4.

The controller of the oven 300_4 may acquire the first information OV_INFO1 related to the cooking end time. For example, the controller may acquire the first information OV_INFO1 by calculating the cooking end time based on the end times of an operation which is currently being performed and an operation to be performed. The controller of the oven 300_4 may transmit the first information OV_INFO1 to the watch-type mobile terminal 100.

In some embodiments, the oven 300_4 may periodically acquire the first information OV_INFO1 and periodically transmit the acquired first information OV_INFO1 to the watch-type mobile terminal 100.

In another embodiment, the oven 300_4 may transmit the first information OV_INFO1 to the watch-type mobile terminal 100 when the current time reaches a time earlier than a cooking end time by a predetermined reference time. For example, when the cooking end time is "11:20" and the predetermined reference time is "20 min", the oven 300_4 may transmit the first information OV_INFO1 to the watch-type mobile terminal 100 when the current time reaches "11:00".

The controller 180 of the watch-type mobile terminal 100 may display the item 410 corresponding to the event (cooking end) on the clock screen based on the received first information OV_INFO1. The item 410 may be displayed at the position of the clock screen corresponding to the cooking end time, thereby intuitively indicating the cooking end time.

In some embodiments, the controller 180 may or may not display the item 410 based on a difference between a time when the first information OV_INFO1 is received from the oven 300_4 and the cooking end time. For example, if the time when the first information OV_INFO1 is received from the oven 300_4 (e.g., "10:50") is not within the reference time (e.g., "20 min") of the washing end time (e.g., "11:20"), the controller 180 may not display the item 410 on the clock screen. In contrast, as shown in FIG. 23, if the time when the first information OV_INFO1 is received from the oven 300_4 (e.g., "11:00") is within the reference time (e.g., "20 min") of the washing end time (e.g., "11:20"), the controller 180 may display the item 410 on the clock screen.

The controller 180 may further display a notification message 467 indicating the cooking end time on the clock screen based on the current time and the cooking end time.

Figure 24A:
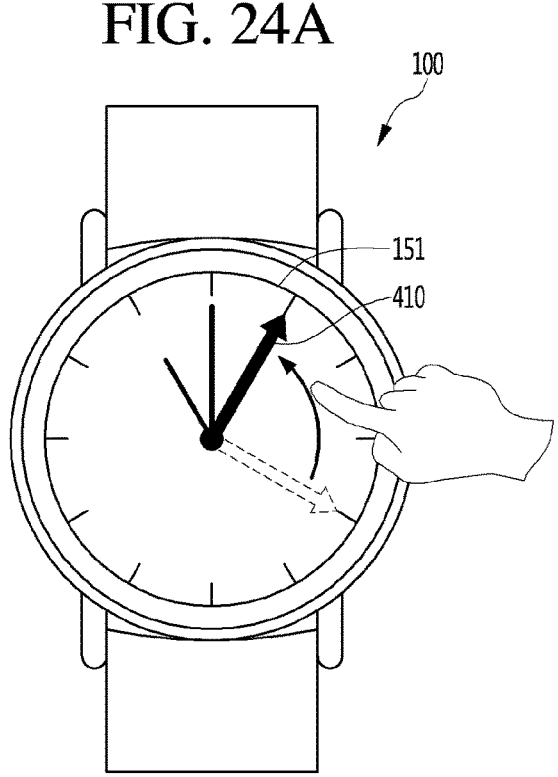
Figure 24B:
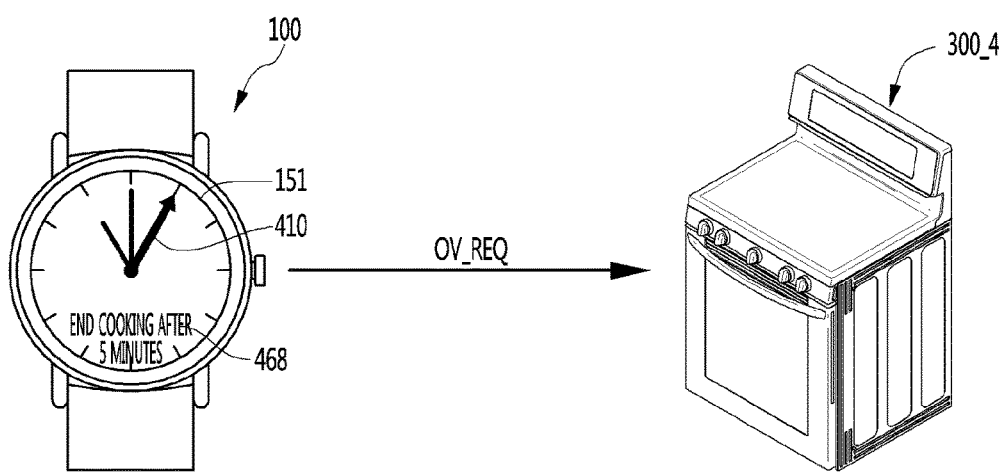

Referring to FIGS. 24a and 24b, in response to a request for adjusting an event occurrence time (cooking end time) received from the watch-type mobile terminal 100 based on the item 410 displayed on the clock screen of the display unit 151, the controller 180 may display the item 410 in correspondence with the adjusted cooking end time included in the request. For example, the controller 180 may move and display the item 410 to ant at the position corresponding to the adjusted cooking end time. In some embodiments, the controller 180 may display an updated notification message 468 based on the request for adjusting the cooking end time.

Referring to FIG. 24b, the controller 180 may transmit the received request for the cooking end time OV_REQ to the oven 300_4. Similarly to the description of FIG. 3, the controller 180 may variously change the order of operation for moving and displaying the item 410 and operation for transmitting the request for adjusting the cooking end time OV_REQ to the oven 300_4.

The controller of the oven 300_4 may control operation of the oven 300_4 in response to the received request for adjusting the cooking end time OV_REQ. If the request for adjusting the cooking end time OV_REQ is a request for advancing the cooking end time from "11:20" to "11:05", the controller of the oven 300_4 may adjust the time of at least one of an operation which is currently being performed and an operation to be performed to change the cooking end time of the oven 300_4.

FIGS. 25a to 25d are diagrams showing operation for controlling an event for an oven using the watch-type mobile terminal according to the embodiment shown in FIG. 18.

Figure 25B:
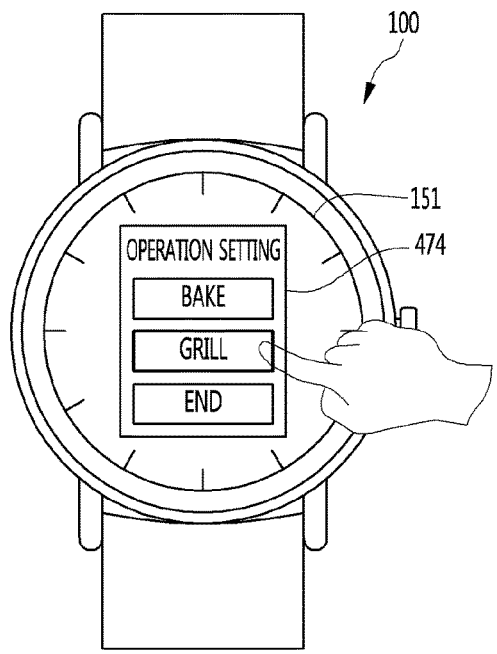

Referring to FIGS. 25a and 25b, the controller 180 may receive a request for selecting the item 410 displayed on the clock screen of the display unit 151. Although touch input for the displayed item 410 is shown as an embodiment of the request in FIG. 25a, the type of the request is not limited thereto.

The controller 180 may display an operation setting window 474 as a menu screen for setting operation of the oven 300_4 connected to the watch-type mobile terminal 100 in response to a request for selecting the item 410. The operation setting window 474 may include an operation setting icon corresponding to at least one operation setting item.

Although, in FIG. 25b, "bake", "grill" and "end" icons are shown as examples of the operation setting icons included in the operation setting window 474, the type of the operation setting icon is not limited thereto.

The "bake" icon may correspond to operation for controlling the oven 300_4 to perform bake operation, the "grill" icon may correspond to operation for controlling the oven 300_4 to perform grill operation, and the "end" icon may correspond to end of operation of the oven 300_4.

The controller 180 may transmit a command for setting operation of the oven 300_4 after an event (e.g., cooking end) corresponding to the item 410 occurs to the oven 300_4, based on a request for selecting any one of the operation setting icons included in the operation setting window 474.

Figure 25C:
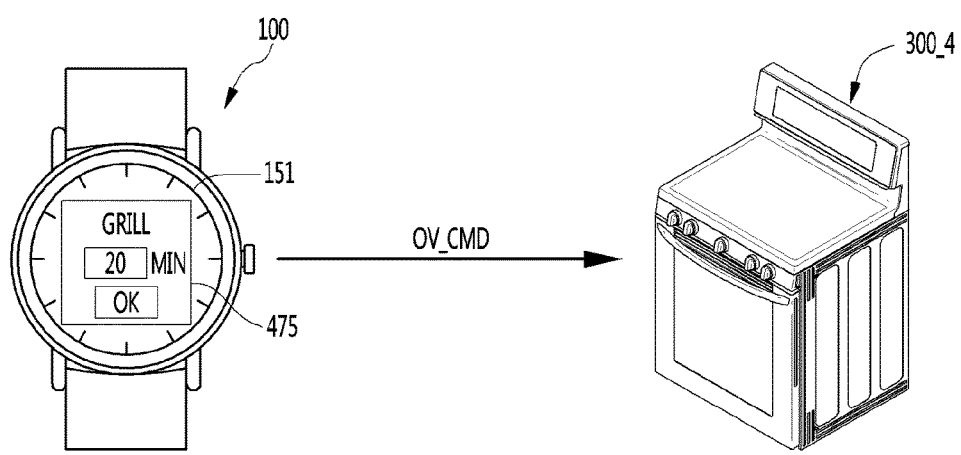
Figure 25D:
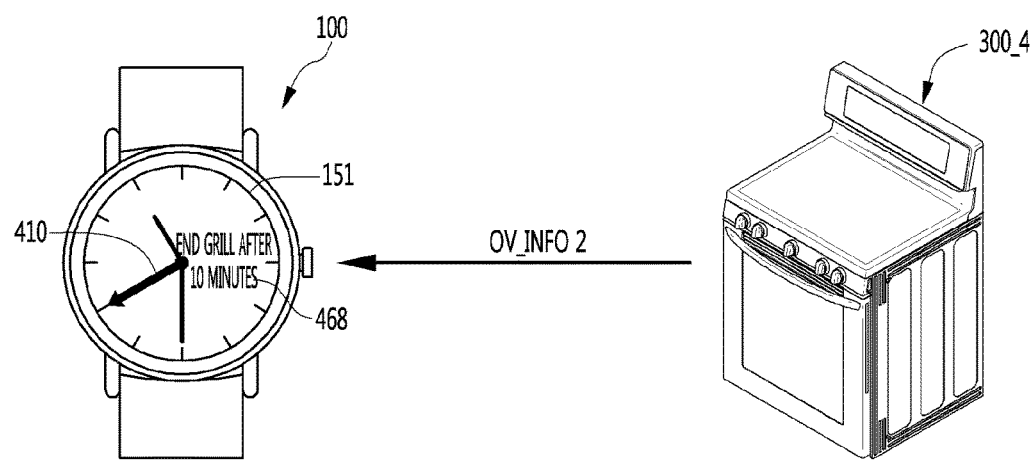

Referring to FIGS. 25b to 25d, when the "grill" icon is selected from among the operation setting icons, the controller 180 may display a grill time setting window 475 for setting a grill time. When the grill time is set through the grill time setting window 475 (e.g., 20 min), the controller 180 may transmit a grill command OV_CMD including information on the grill time to the oven 300_4.

Although not shown, when the "bake" icon is selected from among the operation setting icons, the controller 180 may display a bake time setting window similarly to the grill time setting window 475 shown in FIG. 25c. When the bake time is set through the displayed bake time setting window, the controller 180 may transmit a bake command including information on the bake time to the oven 300_4.

In addition, when the "end" icon is selected, the controller 180 may transmit a command for performing control to end operation of the oven 300_4 to the oven 300_4 after an event corresponding to the item 410 occurs.

Referring to FIG. 25d, the controller of the oven 300_4 may control operation of the oven 300_4 after an event corresponding to the item 410 occurs (e.g., after cooking end) in response to the received grill operation command OV_CMD. For example, as shown in FIG. 25c, when the grill time is "20 min", the controller of the oven 300_4 may control the oven 300_4 to perform the grill operation for 20 minutes.

The controller of the oven 300_4 may acquire second information OV_INFO2 related to a grill end time and transmit the acquired second information OV_INFO2 to the watch-type mobile terminal 100, based on a grill time included in the grill operation command OV_CMD and the current time.

The controller 180 of the watch-type mobile terminal 100 may display the item 410 on the clock screen based on the received second information OV_INFO2. For example, when the grill end time of the oven 300_4 is "11:40", the controller 180 may display the item 410 at the position of the clock screen corresponding to "11:40". In some embodiments, the controller 180 may further display a notification message 468 indicating grill end based on the current time and the grill end time.

That is, the user of the watch-type mobile terminal 100 may adjust the event occurrence time of the external device 300 through the watch-type mobile terminal 100 and conveniently and remotely set the external device 300 after an event occurs.

The present disclosure mentioned in the foregoing description may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller 180 of the terminal. Accordingly, the detailed description is intended to be illustrative, and not to limit the scope of the claims. The scope of the present disclosure should be determined by the appended claims and their legal equivalents, not by the above description, and all changes coming within the meaning and equivalency range of the appended claims are intended to be embraced therein.

What is claimed is:

1. A watch-type mobile terminal comprising:
   a wireless communication unit;
   a display configured to display information including a clock screen; and
   a controller configured to:
      receive information related to an occurrence time of an event from an external display device via the wireless communication unit; and
      cause the display to display a first item corresponding to the event at a first position on the displayed clock screen corresponding to the occurrence time based on the received information,
      receive, from the external display device via the wireless communication unit, information of a period of use of the external display device during a disconnection period when a connection between the watch-type mobile terminal and the external display device is reestablished after the disconnection period; and
      cause the display to display a second item corresponding to the received information at a position on the clock screen corresponding to the period of use,
      wherein the second item indicates the period of use corresponding to a range from a use start time to a use end time on the clock screen.

2. The watch-type mobile terminal according to claim 1, wherein:
   the event is scheduled to occur at the external display device; and
   the controller is further configured to:
      move the displayed first item to a second position on the displayed clock screen corresponding to an adjusted occurrence item in response to an adjusting input to the displayed first item for adjusting the occurrence time; and
      transmit information to the external display device via the wireless communication unit to change the event to occur at the external display device at the adjusted occurrence time in response to the displayed first item being moved to the second position.

3. The watch-type mobile terminal according to claim 1, wherein the received information comprises at least an application executed by the external display device during the period of use or a file accessed by the external display device during the period of use.

4. The watch-type mobile terminal according to claim 3, wherein the controller is further configured to cause the display to display detailed information corresponding to the displayed second item in response to an input for displaying the detailed information.

5. The watch-type mobile terminal according to claim 1, wherein the controller is further configured to:
   receive a notification indicating use of the external display device from the external display device via the wireless communication unit when a distance between the mobile terminal and the external display device is greater than a threshold distance;
   cause the display to display information of the received notification; and
   transmit a wait screen command or a history storage command to the external display device via the wireless communication unit,
   wherein the wait screen command corresponds to changing a screen of the external display device to a wait screen, and
   wherein the history storage command corresponds to storing usage history information of the external display device in a memory.

6. The watch-type mobile terminal according to claim 1, further comprising a motion sensor configured to sense motion of the mobile terminal, wherein
   the controller is further configured to transmit a wait screen release command to the external display device via the wireless communication unit when a motion of the mobile terminal sensed via the sensor corresponds to a predetermined wait screen release motion.

7. The watch-type mobile terminal according to claim 1, wherein the controller is further configured to:
   cause the display to display an operation setting window for setting operation of the external display device after the event occurs in response to a selection of the displayed first item; and
   transmit an operation command to the external display device via the wireless communication unit, the operation command corresponding to an operation setting selected via the displayed operation setting window.

8. The watch-type mobile terminal according to claim 7, wherein:
   the controller is further configured to cause the display to display a time setting window for setting a time of operation corresponding to the selected operation setting; and
   the operation command transmitted to the external display device comprises information of a time of operation selected via the displayed time setting window.

9. A method of operating a watch-type mobile terminal, the method comprising:
   displaying a clock screen;
   establishing connection with an external display device;

receiving information related to an occurrence time of an event from the external display device; and displaying a first item corresponding to the event at a first position on the displayed clock screen corresponding to the occurrence time based on the received information, receiving, from the external display device, information of a period of use of the external display device during a disconnection period when a connection between the watch-type mobile terminal and the external display device is reestablished after the disconnection period; and displaying a second item corresponding to the received information at a position on the clock screen corresponding to the period of use, wherein the second item indicates the period of use corresponding to a range from a use start time to a use end time on the clock screen.

10. The method according to claim 9, wherein:
the event is scheduled to occur at the external display device; and
the method further comprises:
moving the displayed first item to a second position on the displayed clock screen corresponding to an adjusted occurrence time in response to an adjusting input to the displayed first item for adjusting the occurrence time; and
transmitting information to the external display device to change the event to occur at the external display device at the adjusted occurrence time in response to the displayed first item being moved to the second position.

11. The method according to claim 9, wherein the received information comprises at least an application executed by the external display device during the period of use or a file accessed by the external display device during the period of use.

12. The method according to claim 11, further comprising displaying detailed information corresponding to the displayed second item in response to an input for displaying the detailed information.

13. The method according to claim 9, wherein the method further comprises:
receiving, from the external display device, a notification indicating use of the external display device when a distance between the mobile terminal and the external display device is greater than a threshold distance;
displaying information of the received notification; and
transmitting a wait screen command or a history storage command to the external display device,
wherein the wait screen command corresponds to changing a screen of the external display device to a wait screen, and
wherein the history storage command corresponds to storing usage history information of the external display device in a memory.

14. The method according to claim 9, wherein the method further comprises transmitting a wait screen release command to the external display device when a motion of the mobile terminal sensed via a sensor corresponds to a predetermined wait screen release motion.

15. The method according to claim 9, further comprising:
displaying an operation setting window for setting operation of the external display device after the event occurs in response to a selection of the displayed first item; and
transmitting an operation command to the external display device, the operation command corresponding to an operation setting selected via the displayed operation setting window.

16. A machine-readable non-transitory medium having stored thereon machine-executable instructions for:
displaying a clock screen;
establishing connection with an external display device;
receiving information related to an occurrence time of an event from the external display device; and
displaying a first item corresponding to the event at a first position on the displayed clock screen corresponding to the occurrence time based on the received information,
receiving, from the external display device, information of a period of use of the external display device during a disconnection period when a connection between the watch-type mobile terminal and the external display device is reestablished after the disconnection period; and
displaying a second item corresponding to the received information at a position on the clock screen corresponding to the period of use,
wherein the second item indicates the period of use corresponding to a range from a use start time to a use end time on the clock screen.

\* \* \* \* \*